(12) United States Patent
Bouzguarrou et al.

(10) Patent No.: US 11,803,390 B1
(45) Date of Patent: Oct. 31, 2023

(54) PREDICTION CLASS DETERMINATION

(71) Applicant: Arm Limited, Cambridge (GB)

(72) Inventors: Houdhaifa Bouzguarrou, Valbonne (FR); Guillaume Bolbenes, Vallauris (FR); Thibaut Elie Lanois, Peymeinade (FR)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/855,860

(22) Filed: Jul. 1, 2022

(51) Int. Cl.
*G06F 9/38* (2018.01)
*G06F 9/30* (2018.01)
*G06F 9/32* (2018.01)

(52) U.S. Cl.
CPC ........ *G06F 9/3844* (2013.01); *G06F 9/30072* (2013.01); *G06F 9/3802* (2013.01); *G06F 9/3816* (2013.01); *G06F 9/325* (2013.01)

(58) Field of Classification Search
CPC .. G06F 9/3816; G06F 9/30072; G06F 9/3802; G06F 9/3806; G06F 9/325; G06F 9/3844
See application file for complete search history.

(56) References Cited

U.S. PATENT DOCUMENTS

| | | | | |
|---|---|---|---|---|
| 11,132,200 | B1* | 9/2021 | Chavan | G06F 9/381 |
| 2004/0044885 | A1* | 3/2004 | Zou | G06F 9/3824 |
| | | | | 712/E9.046 |
| 2012/0166765 | A1* | 6/2012 | Gonion | G06F 9/3804 |
| | | | | 712/205 |
| 2020/0050458 | A1* | 2/2020 | Bouzguarrou | G06F 9/30065 |
| 2022/0283811 | A1* | 9/2022 | Al Sheikh | G06F 9/325 |
| 2023/0120596 | A1* | 4/2023 | Pusdesris | G06F 9/3859 |
| | | | | 712/208 |

FOREIGN PATENT DOCUMENTS

EP 821305 A2 * 1/1998 ............ G06F 9/325

OTHER PUBLICATIONS

Arm Limited, Proprietary Notice—CPYP, CPYM, CPYE, 2021, 8 pages.

* cited by examiner

*Primary Examiner* — Courtney P Carmichael-Moody
(74) *Attorney, Agent, or Firm* — NIXON & VANDERHYE P.C.

(57) ABSTRACT

There is provided an apparatus, method and medium. The apparatus comprises processing circuitry to perform data processing in response to decoded instructions and prediction circuitry to generate a prediction of a number of iterations of a fetching process. The fetching process is used to control fetching of data or instructions to be used in processing operations that are predicted to be performed by the processing circuitry. The processing circuitry is configured to tolerate performing one or more unnecessary iterations of the fetching process following an over-prediction of the number of iterations and, for at least one prediction, to determine a class of a plurality of prediction classes, each of which corresponds to a range of numbers of iterations. The prediction circuitry is also arranged to signal a predetermined number of iterations associated with the class to the processing circuitry to trigger at least the predetermined number of iterations of the fetching process.

20 Claims, 16 Drawing Sheets

US 11,803,390 B1

PREDICTION CLASS DETERMINATION

TECHNICAL FIELD

The present invention relates to the field of data processing.

BACKGROUND

A data processing apparatus may have prediction circuitry for predicting a number of iterations of a fetching process to control the fetching of data or instructions to be used in processing operations performed by processing circuitry. This can help to improve performance by allowing the data or instructions to be fetched before it is known whether or not they are required for the processing operations that are performed by the processing circuitry.

SUMMARY

In example configurations described herein there is an apparatus comprising:
 processing circuitry to perform data processing in response to decoded instructions; and
 prediction circuitry to generate a prediction of a number of iterations of a fetching process, the fetching process used to control fetching of data or instructions to be used in processing operations that are predicted to be performed by the processing circuitry,
 wherein:
 the processing circuitry is configured to tolerate performing one or more unnecessary iterations of the fetching process following an over-prediction of the number of iterations; and
 the prediction circuitry is configured, for at least one prediction, to determine a class of a plurality of prediction classes, each of the plurality of prediction classes corresponding to a range of numbers of iterations, and to signal a predetermined number of iterations associated with the class to the processing circuitry to trigger at least the predetermined number of iterations of the fetching process.

In example configurations described herein there is a method of operating an apparatus comprising processing circuitry to perform data processing in response to decoded instructions, the method comprising:
 generating a prediction of a number of iterations of a fetching process, the fetching process used to control fetching of data or instructions to be used in processing operations that are predicted to be performed by the processing circuitry,
 wherein the processing circuitry is configured to tolerate performing one or more unnecessary iterations of the fetching process following an over-prediction of the number of iterations; and
 for at least one prediction, determining a class of a plurality of prediction classes, each of the plurality of prediction classes corresponding to a range of numbers of iterations, and signalling a predetermined number of iterations associated with the class to the processing circuitry to trigger at least the predetermined number of iterations of the fetching process.

In example configurations described herein there is a non-transitory computer readable storage medium to store computer-readable code for fabrication of an apparatus comprising:
 processing circuitry to perform data processing in response to decoded instructions; and
 prediction circuitry to generate a prediction of a number of iterations of a fetching process, the fetching process used to control fetching of data or instructions to be used in processing operations that are predicted to be performed by the processing circuitry,
 wherein:
 the processing circuitry is configured to tolerate performing one or more unnecessary iterations of the fetching process following an over-prediction of the number of iterations; and
 the prediction circuitry is configured, for at least one prediction, to determine a class of a plurality of prediction classes, each of the plurality of prediction classes corresponding to a range of numbers of iterations, and to signal a predetermined number of iterations associated with the class to the processing circuitry to trigger at least the predetermined number of iterations of the fetching process.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
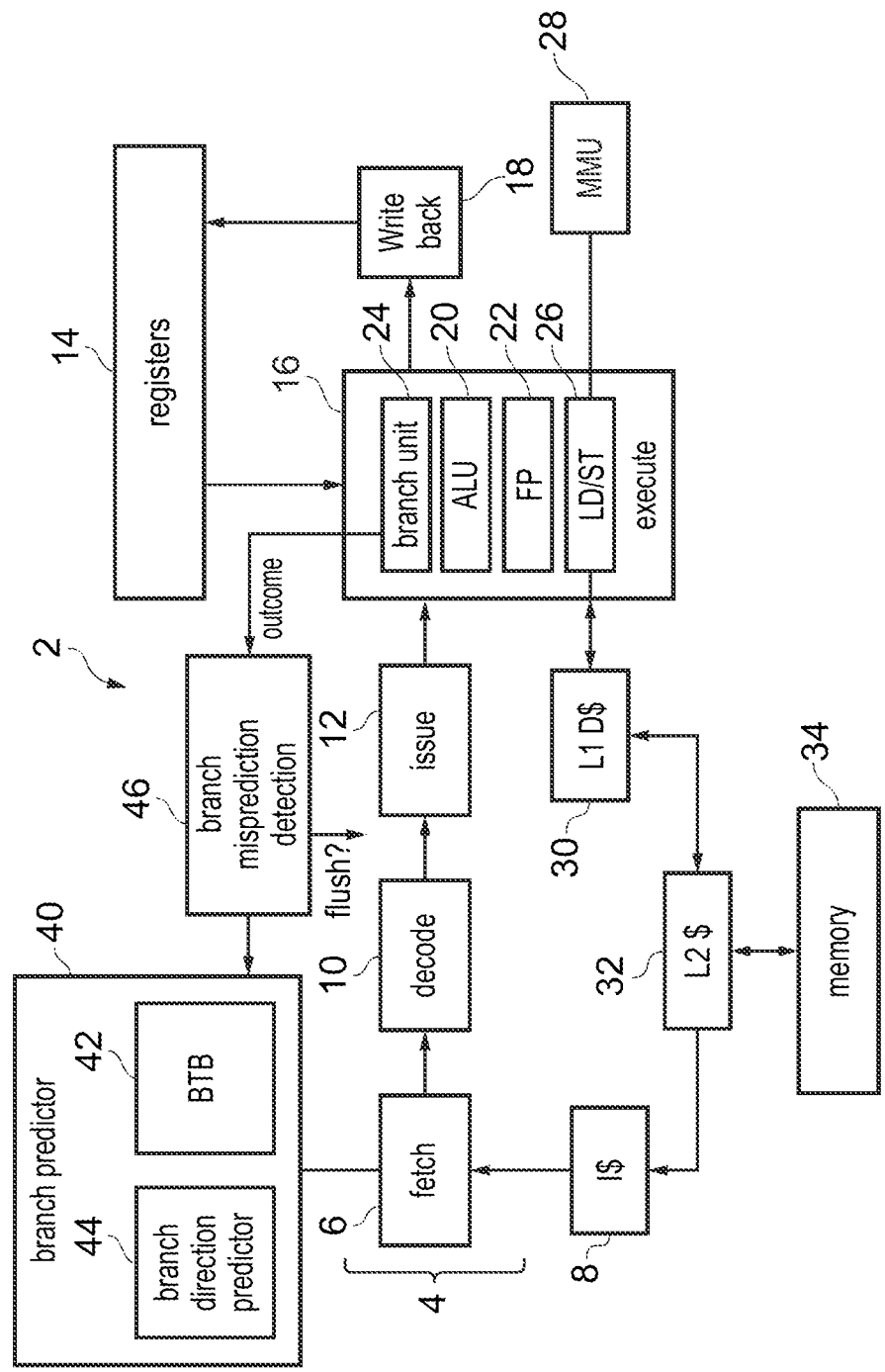
FIG. 1 schematically illustrates an example of a data processing apparatus.

Before discussing the configurations with reference to the accompanying figures, the following description of configurations is provided.

In accordance with one example configuration there is provided an apparatus comprising processing circuitry to perform data processing in response to decoded instructions. The apparatus also comprises prediction circuitry to generate a prediction of a number of iterations of a fetching process which is used to control fetching of data or instructions to be used in processing operations that are predicted to be performed by the processing circuitry. The processing circuitry is configured to tolerate performing one or more unnecessary iterations of the fetching process following an over-prediction of the number of iterations and the prediction circuitry is configured, for at least one prediction, to determine a class of a plurality of prediction classes, where each of the plurality of prediction classes corresponding to a range of numbers of iterations. The prediction circuitry is also arranged to signal a predetermined number of iterations associated with the class to the processing circuitry to trigger at least the predetermined number of iterations of the fetching process.

Fetching of data or instructions by processing circuitry can take a number of instruction cycles and, potentially, lead to increased latency and reduced throughput of the processing the processing circuitry if the processing circuitry has to pause processing (stall) and wait for the fetching process to complete before it continues processing. To reduce the number of occurrences of stalls, some apparatuses are provided with prediction circuitry to predict instances of the fetching process before it is known whether or not those instances are required. The apparatus can then carry out the fetching process so that the data or instructions that are fetched are available to the processing circuitry if/when it is determined that the data or instructions are required. There are some instances of fetching processes for which a plurality of iterations of a fetching process may be required. Predicting such fetching processes may include a determination that the fetching process is required and a determination of how many iterations of the fetching process are required. In such fetching processes, the number of iterations that are required can be highly variable. Hence, for some apparatuses the prediction circuitry is configured to predict a number of (how many) iterations of a fetching process to signal to the processing circuitry in order to trigger the processing circuitry to perform the number of iterations of the fetching process prior to a determination, by the processing circuitry, of how many iterations (or, in some situations, that any iterations) of the fetching process are required. In general, accuracy of the prediction circuitry contributes to the overall efficiency of the processing circuitry. If the prediction circuitry under-predicts the number of iterations (predicts too few iterations) of the fetching process then the processing circuitry may suffer from latency associated with triggering further iterations of the fetching process at a time when the data or instructions that are retrieved by the fetching process are required. For some variants of the fetching process, under-prediction may also include the flushing of processing circuitry to remove any further instructions, for which processing has begun on the assumption that no further iterations are required, from the processing circuitry. Such under-predictions can result in reduced throughput because the processing circuitry may have to wait for the fetch iterations to be carried out before it can perform processing using the data or instructions that have been fetched by the fetching process.

On the other hand, while one may think that an over-prediction of the number of iterations (a prediction of too many iterations) of the fetching process may result in a need to take corrective action, either to prevent the additional iterations of the fetching process from causing the processing circuitry to produce an architecturally incorrect result, and/or to prevent the processing circuitry from wasting resources unnecessarily processing the additional iterations and thereby preventing those resources being used elsewhere, not all fetching processes result in all of the aforementioned costs. In particular, for some fetching processes, the processing circuitry may be tolerant to an over-prediction of the number of iterations such that one or more unnecessary iterations that are predicted do not affect the results generated by the processing circuitry. In other words, for such fetching processes, the processing circuitry still produces an architecturally correct result if the one or more unnecessary iterations are performed with the one or more unnecessary iterations effectively being treated as null operations. For such fetching processes, there is a trade-off to be made in the case that the number of iterations are over-predicted. In particular, the cost to performance of allowing over-predicted iterations of the fetching processes to continue may be lower than the cost to performance of taking any corrective actions. In order to exploit this observation, the prediction circuitry is arranged to predict the number of iterations by determining a class, out of a plurality of possible prediction classes, corresponding to a range of numbers of iterations and to signal a predetermined number of iterations associated with the determined class to the processing circuitry. As a result, the prediction circuitry is not required to accurately predict the precise number of iterations that are to be performed. Instead, a coarse grained prediction based on the determination of one of the plurality of prediction classes is performed. By basing the prediction on a predetermined number of iterations associated with one of a plurality of classes, each of which is associated with a range of numbers of iterations, a simpler implementation can be achieved reducing the overall circuit area and power consumption of the prediction circuitry. Furthermore, this mechanism allows the number of predicted iterations to be tailored, for example, through the selection of class boundaries and the predetermined number of iterations, based on properties of a particular implementation of the processing circuitry. In this way, the apparatus can be designed such that, for a particular processing circuitry running typical programs, the likelihood of an under-prediction can be decreased and the overall latency associated with the fetch process can be reduced.

The definition of the prediction classes can be defined in a number of ways. In some configurations, the prediction classes can be hardwired into the prediction circuitry. For example, the class definition circuitry could comprise comparison logic to determine whether one or more fixed thresholds have been exceeded. In some configurations, the prediction circuitry comprises class definition storage circuitry to store a class definition, the class definition defining the range of numbers of iterations associated with at least one of the plurality of prediction classes. For example, the class definition could indicate that a class of the plurality of prediction classes contains any number of iterations between two defined limits. The two defined limits could be either explicitly stored in the prediction class storage or, alternatively, at least one of the limits could be implicitly defined, for example, the prediction class storage could store a single iteration limit to define boundary between a lower prediction class and a higher prediction class where the lower prediction class contains all numbers of iterations that are less than the single iteration limit and all numbers of iterations that are more than or equal to the single iteration limit falling within the higher prediction class. Alternatively, the prediction class storage could define an integer indicating a level of coarse graining to be applied to the number of iterations. For example, the prediction class storage could store a number N indicating when the numbers of iterations are to be classified into groups of size $2^N$.

Whilst the class definition may be fixed, in some configurations, the processing circuitry is responsive to a class modification instruction specifying a modified class definition to update the class definition with the modified class definition. The class modification instruction may be an instruction belonging to an instruction set architecture (ISA) that is interpreted by decoder circuitry comprised within the processing circuitry. An ISA is a complete set of instructions that are supported by decoder circuitry that is associated with the processing circuitry. The decoder circuitry acts as an interface to interpret the instructions from ISA in order to generate control signals that cause the processing circuitry to operate in a particular way. Instructions of the ISA can be provided by a programmer or compiler to the processing circuitry in order to control the operation of that processing circuitry. A class modification instruction therefore allows for a user or an software process, for example, controlled by an operating system, to modify the class definition. This provides a degree of control that can be used to modify the class definitions at runtime which may be desirable if, for example, a programmer knows that, for a particular program running on a particular implementation of processing circuitry, may benefit from a particular class definition. In addition, the class modification instruction allows for a runtime optimisation algorithm to be applied to modify the class definitions at runtime based on observed performance characteristics (instruction throughput, number of incorrect predictions, etc.). The class modification instruction may be a dedicated ISA instruction for the updating of class information. Alternatively, the class modification instruction could be another instruction of an ISA that can be repurposed to modify class information. For example, the class definition could be stored in a system register and the class modification instruction could be a system register modifying instruction. Alternatively, the class definition could be stored in the memory address space and the class modification instruction could be a write instruction specifying as the write target address the address of the memory location storing the class definition.

In addition, or as an alternative to the above software optimisation algorithm, in some configurations the prediction circuitry is configured to dynamically adjust the class definition in response to a distribution of resolved iteration counts. At some point, either during or before the processing of the predetermined number of iterations of the fetching process, the processing circuitry may determine a resolved iteration count indicative of the actual number of iterations that are required to be performed. This mechanism provides feedback to the prediction circuitry that can be used to dynamically adjust (modify) the class definition, and in some configurations, the predetermined number of iterations that are associated with the classes defined by the class definition. As a result, the prediction circuitry can tune its predictions to increase the accuracy of the predictions and to improve the overall throughput of the processing circuitry.

In some configurations the prediction circuitry is responsive to the distribution of resolved iteration counts indicating frequent occurrences of a particular number of iterations that falls outside of one of the plurality of prediction classes and within a dynamic adjustment threshold of the one of the plurality of prediction classes, to dynamically modify the class definition to extend the one of the plurality of prediction classes to include the particular number of iterations. As a purely illustrative example, if the prediction circuitry were arranged to signal x iterations as the predetermined number of iterations associated with a particular class but the distribution of resolved iteration counters indicated that $x+\gamma$ iterations were often observed, the prediction circuitry may be responsive to $\gamma$ being within a predetermined threshold of x to extend the class definition to incorporate $x+\gamma$ in the particular class and to signal $x+\gamma$ as the predetermined number of iterations in response to the particular class being predicted. In such a way the prediction circuitry can dynamically modify the class boundaries as defined in the class definition resulting in an improved accuracy of the prediction class and an increased throughput of the operations carried out by the processing circuitry.

In some configurations the plurality of prediction classes comprises a highest prediction class associated with a range of highest numbers of iterations; the predetermined number of iterations associated with each prediction class other than the highest prediction class is a maximum number of iterations associated with that prediction class; and the predetermined number of iterations associated with the highest prediction class is a predefined maximum number of iterations. By predicting the maximum number of iterations associated with each prediction class other than the highest prediction class, the likelihood of under-prediction is reduced resulting in an improved performance. Furthermore, by defining the predetermined number of iterations associated with the highest prediction class as a predefined maximum number of iterations, an upper limit on the number of iterations that can be predicted is set. The predefined maximum number of iterations may be a number of iterations associated with the highest prediction class. Alternatively, the predefined maximum number of iterations may be defined as the maximum number of iterations associated with the second highest prediction class.

The processing circuitry is arranged to trigger at least the pre-determined number of iterations that are signalled. In some configurations, the processing circuitry may be arranged to trigger one or more additional iterations to account for fetch processes that are not aligned to an address alignment boundary. Alternatively, in some configurations, the prediction circuitry is configured such that the predetermined number of iterations can be artificially increased to compensate for the alignment boundaries.

One example of a fetching process is the fetching of one or more instructions in response to a prediction made by branch prediction circuitry. Hence, in some configurations the prediction circuitry comprises branch prediction circuitry configured to perform branch prediction to predict outcomes of branch instructions, and based on the branch prediction, to perform, as the number of iterations of the fetching process, fetching iterations of instructions to be decoded for processing by the processing circuitry. Each iteration may correspond to a single instruction or a plurality (block) of instructions which may be issued for processing by one or more cycles of processing by the processing circuitry. In some configurations the processing circuitry comprises a processing pipeline in which subsequent iterations of processing are processed at sequential stages of the pipeline. In such configurations, an under-prediction of a number of iterations may result in the need to flush any instructions that occur sequentially after the instructions fetched as a result of the iterations of the fetching process from the pipeline before further iterations of the instructions fetched as a result of the iterations of the fetching process can be issued to the pipeline. On the other hand, if the iterations of the fetching process are over-predicted such that one or more unnecessary instructions are issued as a result of one or more unnecessary iterations of the fetching process, because the processing circuitry is tolerant to performing one or more unnecessary iterations of the fetching process, there is no requirement to flush the processing circuitry and, instead, the one or more unnecessary instructions can be processed without resulting in an architecturally incorrect result.

In some configurations, the prediction circuitry is configured to generate the prediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, wherein if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an effect of the at least one unnecessary iteration of the predicated loop body. For example, the predicated loop body could use a certain variable to track whether the loop should be terminated and once that variable reaches the condition in which the loop should be terminated then other operations in that predicated loop body may in any case have their operations predicated based on that variable. For example, this could be useful if the predicated loop body uses a variable to track a number of remaining units of data to be processed and terminate the loop when no remaining units of data are to be processed, and other operations within the predicated loop body are predicated based on the number of remaining units of data to be processed, so that if the number of remaining units of data has reached zero then those other operations would in any case have their effect suppressed. Such a predicated-loop-terminating branch instruction can be extremely hard to predict for the branch prediction circuitry, because the number of required iterations in the loop as a whole may vary from one instance of performing the entire loop to another instance of performing the entire loop, for example based on data dependent variables. Therefore, the misprediction rate for such predicated-loop-terminating branch instructions can be high. In typical branch prediction schemes, the usual approach for resolving branch mispredictions may be to flush the incorrectly fetched instructions from a processing pipeline, where the flushed instructions are the instructions which are younger than the mispredicted branch operation, and then to resume fetching of instructions from the correct instruction which should have been processed after the branch based on the correct branch outcome. However, because the processing circuitry is tolerant to the mispredicted iterations, the processing circuitry does not need to flush the mispredicted iterations. Because of this, it is more beneficial for the prediction circuitry to over-predict the number of iterations of fetching than to under-predict the number of iterations of fetching. The coarse graining that is provided through the use of a plurality of different prediction classes and through signalling a predetermined number of iterations based on the predicted class, may result in the predictions being rounded up to the predetermined number of iterations associated with that class. Hence, a simpler implementation can be provided that results in a smaller circuit area and a reduced power consumption.

In some configurations the branch prediction circuitry comprises one or more prediction tables each comprising a plurality of branch predictions; the branch prediction circuitry is configured to perform the branch prediction by performing a lookup in the one or more prediction tables; and for an entry of the one or more prediction tables predicted to correspond to the predicated-loop-terminating branch instruction, the entry specifies a predicted class identifying the class to use for predicting the predetermined number of iterations The lookup can be performed using any information indicative of the predicated-loop-terminating branch instruction. In some configurations the lookup is based on a program counter value associated with the predicated-loop-terminating branch instruction. The lookup based on the program counter value may be a lookup directly using the program counter value or a lookup using a hash of at least a portion of the program counter value. In some configurations, the plurality of tables comprises a branch target buffer.

In some configurations the apparatus further comprises program flow history storage to store history data indicative of a history of program flow, wherein: the one or more prediction tables comprises a plurality of history dependent prediction tables; the lookup comprises a history dependent lookup based on the history data in the plurality of history dependent prediction tables; and the prediction circuitry is responsive to the history dependent lookup resulting in a hit, to determine the class based on the hit. The provision of history dependent tables takes into account that a branching decision may be dependent on the path that the program has taken in order to reach that branch instruction. The provision of branch prediction history storage indicative of a history of program flow in combination with the program counter value provides an indication of the program flow and is indicative of a sequence of instructions, events, or branches that have preceded that branch instruction. In some configurations, the history dependent lookup is performed in combination (for example, in parallel or in response to a same predicated loop branch terminating instruction) with a lookup in a default table based on a program counter value. The provision of a default table, which bases a prediction on a lookup using the program counter value or a hash of the program counter value, provides a storage structure for which it is more likely, for a given program counter value, that a prediction will be stored. Hence, the default table provides a fall-back position for cases in which the history dependent lookup results in a miss. In some configurations, the history dependent lookup is performed based on a combination of the history data and a program counter value associated with that branch instruction. For example, the lookup may be performed based on a concatenation of at least a portion of the program counter value with at least a portion of the history data or a value that is derived from a hash of a combination of at least a portion of the history data and at least a portion of the program counter value.

In some configurations at least two of the history dependent prediction tables are looked up based on a hash that is determined from a different sized portion of the history data. In some configurations, the plurality of history dependent prediction tables are arranged as a TAGE prediction structure or an ITIAGE prediction structure. Incorporating the history data in the lookup information for the history dependent prediction tables provides for a more accurate prediction but is more likely to result in the history dependent lookup resulting in a miss. Furthermore, it is conceivable that a branch instruction or a predicated loop terminating branch instruction is arrived at via a sequence of program instructions that has not previously (or at least not recently) been observed and that is therefore not recorded (or no longer recorded) in the plurality of history dependent prediction tables. Hence, the prediction circuitry is arranged to determine the class of the plurality of prediction classes based on the lookup in the history dependent prediction tables when such a lookup hits in the history dependent lookup tables and to revert to a default class determined from the base prediction table when the lookup in the plurality of history dependent prediction tables misses.

The history data that is stored in the branch prediction history storage can comprise any data indicative of program flow. For example, a history of previously taken and not taken branch taken/not taken outcomes can be used to comprise the history data. Alternatively, a call path history or a hash based on the call path history can be used to comprise the history data. In some configurations the prediction circuitry is configured, for the prediction of the number of iterations of the fetching process, to store the class used for predicting the predetermined number of iterations to the program flow history storage. The class information provides a more detailed indication of the behaviour of a predicated-loop-terminating branch instruction than an indication as to whether the branch was taken or not taken. Hence, by incorporating the class prediction into the history data the class of the plurality of classes can be predicted more accurately. In some configurations, the program flow history storage is a first in first out buffer arranged as a first in first out shift register or a circular buffer, in which data indicative of the program flow is input such that the program flow history storage retains a number of history data items defined by the length of the program flow history storage.

Whilst dedicated tables can be provided for the predicated loop branching instruction, regular branch prediction tables can be repurposed for the predicated loop branching instruction. Hence, in some configurations the prediction circuitry is configured to store, in the one or more prediction tables, prediction type information indicative of whether that prediction corresponds to a class prediction or a regular branch prediction; and each prediction specified in the one or more prediction tables having a prediction field, which for class predictions is configured to indicate the class and for regular branch predictions is configured to indicate a predicted branch outcome, for example, a taken/not taken outcome or a branch target address. The provision of a plurality of classes, each corresponding to a range of numbers of iterations, enables the prediction to be defined in a sufficiently compact form to allow storage in standard prediction tables, for example, within TAGE prediction tables. In some configurations the predicted branch outcome is an indication of whether the branch is taken or not taken. For example, a two bit value could be provided to indicate that the branch is strongly taken, taken, not taken, or strongly not taken. Such a configuration provides two bits within the TAGE prediction tables that can be repurposed for the indication of the predicted class. Whilst the taken/not taken information does not provide sufficient storage to define a prediction at an integer granularity, the bits used to indicate taken/not taken can be repurposed to define a class out of a plurality of (four) prediction classes. Hence, basing the prediction on the prediction classes enables for an efficient implementation repurposing the taken/not taken outcome in the prediction tables.

The techniques discussed above can be useful for any branch which controls termination of loop which comprises a predicated loop body for which effects of the predicated loop body will be suppressed by predication if the loop body is executed unnecessarily following a mispredicted-non-termination branch misprediction for the predicated-loop-terminating branch instruction. In some configurations the predicated loop body comprises operations to: determine a variable number of bytes to be processed in a current iteration; perform at least one processing operation based on the variable number of bytes determined for the current iteration, the at least one processing operation including at least one of a load operation and a store operation; and update based on the variable number of bytes, a remaining bytes parameter indicative of a remaining number of bytes to be processed.

In some configurations the loop termination condition for a given iteration of the predicated-loop-terminating branch instruction can be considered satisfied when the remaining bytes parameter indicates that the number of remaining bytes to be processed is zero. A loop comprising this type of predicated loop body can be useful for allowing a specified total number of bytes to be processed iteratively when the total number of bytes required to be processed may be greater than the maximum number of bytes that can be processed by the processing circuitry in one iteration. This type of predicated loop body is particularly suitable for the branch prediction resolution techniques discussed above, because, in the condition when the loop termination condition should be satisfied, the variable number of bytes may be zero and so processing a further iteration of the predicated loop body unnecessarily may in any case have the at least one processing operations suppressed by predication based on the fact that the variable number of bytes determined for that further iteration will be zero. Hence, this gives opportunities to reduce the delay associated with handling mispredicted-non-termination branch mispredictions by suppressing flushing to allow at least one unnecessary iteration of the predicated loop body to remain in the pipeline.

It is often more efficient to perform aligned loads or aligned stores than unaligned loads or unaligned stores. Hence, when the target address is an unaligned address, the data processing apparatus may be arranged to perform an additional load and/or store operation during the sequence of load/store operations. The additional load/store operation may comprise loading/storing a smaller amount of data than the maximum supported amount per iteration in order to realign the load/store operations to an alignment boundary. Hence, any iterations of the load/store operation that occur after the additional load/store operation are aligned load/store operations. As a result, the total number of iterations associated with the predicated-loop-terminating branch instruction is one higher than would otherwise be expected. Hence, in some configurations the variable number of bytes is dependent on alignment of a target address of the at least one of the load operation and the store operation with respect to an alignment boundary; the prediction circuitry is configured to store, in the one or more prediction tables, alignment hint information indicative of whether that prediction corresponds to an aligned target address; and the prediction circuitry is responsive to the branch prediction comprising alignment information indicating that the prediction corresponds to an unaligned target address, to trigger an additional iteration of the fetching process in addition to triggering at least the predetermined number of iterations of the fetching process. In this way prediction circuitry can be provided that adapts the classes for unaligned loads. For example, if the classes are defined in a such a way that the predetermined number of iterations for each class accurately predicts a particular subset of predicated-loop-terminating branch instructions when those instructions correspond to load operations or store operations that are aligned to an alignment boundary, then the class definitions may not be accurate for the same subset of predicated-loop-terminating branch instructions when those instructions correspond to load or store operations that are not aligned to an alignment boundary. Hence, the provision of the alignment hint provides the means to adapt the classes for the unaligned load/store operation. For example, if a particular class has a class boundary that is defined at a particular number of iterations and the predetermined number of iterations associated with the particular class is the particular number of iterations, then aligned load/store operations that require the particular number of iterations will benefit from the prediction circuitry predicting the particular class. On the other hand, unaligned load/store operations that also require the same particular number of iterations would be under-predicted by the particular class because of the use of an additional iteration to realign the load/store operations to the boundary, and would therefore be assigned a higher prediction class by the prediction circuitry resulting in a potentially large number of iterations that are predicated. The provision of the alignment hint introduces flexibility and results, for this case, in both the aligned load/store operations and the unaligned load/store operations being best predicted by the same class, thereby reducing the need for the processing circuitry executing additional iterations.

The techniques discussed above can be particularly useful in predicated loops which implement certain string processing library functions defined in the string.h header file of the C programming language. String.h is a library which provides a certain group of functions for manipulating strings stored in memory, where a string is a sequence of text characters. These functions can include memcpy (a function to copy a string from one region of memory to another), memcmp (a function to compare two strings), strchr (a function to search for the first occurrence of a specified character within a given string loaded from memory), strlen (a function to determine the length of a specified string variable, e.g. by searching for the first byte equal to 0 after a particular address in memory), and so on. Such functions can seem apparently simple to the software developer, but can be relatively performance intensive when compiled into the machine code which will actually be executed by the processor. In the compiled code, these functions may be implemented by using a predicated loop body similar to the one discussed above. In some software applications, a relatively large fraction of processing time can be taken up by such string processing functions. As each instance of calling the string.h processing function may lead to multiple iterations of the predicated loop body being performed and each iteration of the predicated loop body may be associated with a predicated-loop-terminating branch instruction, such software applications may be extremely prone to loss of performance caused by branch mispredictions. As discussed above the branch penalty associated with over-predicting a number of iterations for such predicated loops can be lower than the branch prediction associated with under-prediction such predicated loops. The techniques described herein can provide a lower circuit area implementation that can be used to perform such a prediction. In particular, the provision of prediction classes for which a number of predicted iterations is based on a predetermined number of iterations that is associated with that class results in a relative increase in the likelihood that the number of iterations will be over-predicted rather than under predicted thereby exploiting the lower branch penalty that is associated with such over-predictions. Hence, it can be particularly useful for the predicated loop body to comprise operations to implement a string.h C library function.

One particular example of a string.h library function for which this technique can be particularly useful is the memcpy function, which copies a variable number of bytes of data from first memory region to a second memory region. Memcpy operations are very common in some software applications, and can be slow to process as they can involve iteration of load operations to load bytes of data from memory and dependent store operations to store the loaded bytes to a different region of memory. The loop executed for the memcpy operation can be a relatively tight loop for which the penalty caused by load/store delays and branch mispredictions can be high. By using the techniques discussed above, a lower circuit area implementation can be provided in which there is a reduced likelihood of under-prediction relative to the likelihood of over-prediction. Therefore, the delay penalty associated with branch mispredictions, which may occur reasonably frequently for the predicated-loop-terminating branch that arises in such memcpy operations, is reduced. Hence, it can be particularly useful to use the techniques described above when the predicated loop body comprises a memory copy operation to copy data from a first memory region to a second memory region.

In some configurations the apparatus comprises misprediction circuitry to perform one or more correction actions in response to at least one of: a misprediction of the number of iterations being an under-prediction of the number of iterations; a misprediction of the number of iterations being an over-prediction and falling outside an allowable iteration range. In some configurations the one or more correction actions comprise flushing a processing pipeline and triggering at least one further instruction. In some configurations, when the misprediction is an under-prediction, the at least one further instruction is at least one further iteration; and when the misprediction is an over-prediction falling outside the allowable iteration range, the at least one further instruction comprises the instruction, in a sequence of instructions, following the loop of which the predicated-loop-terminating branch is a part. The definition of an allowable iteration range provides an upper limit on the number of unnecessary iterations that are processed by the processing circuitry. In some configurations, the allowable iteration range may be defined based on the length of the processing pipeline.

Another example of a fetching process is the a prefetching process. Hence, in some configurations the prediction circuitry is prefetch prediction circuitry configured perform a prefetch prediction to predict, as the number of iterations, a number of blocks of data or instructions to be prefetched from memory into a storage structure associated with the processing circuitry and, based on the prefetch prediction, to perform, as the fetching process, a number of iterations of prefetching. Each iteration may correspond to the prefetching of a single block of data into a data cache or a single block of instructions into an instruction cache. In some configurations, each iteration of prefetching is issued to prefetch sequential blocks of instructions or data. Alternatively, sequential iterations of prefetching may be used to prefetch blocks of instructions separated in memory by a stride length. In such configurations, an under-prediction of a number of iterations may result in the need to fetch further instructions or data at a time when the data or instructions is required by the processing circuitry. Hence, an under-prediction of the number of iterations could result in a processing delay whilst the instructions or data is retrieved from memory. On the other hand, if the iterations of the fetching process are over-predicted such that one or more unnecessary instructions are issued as a result of one or more unnecessary iterations of the fetching process, the processing circuitry will be tolerant to performing the one or more unnecessary iterations of the fetching process which, in the case of such configurations, would result in additional data or instructions being prefetched to a corresponding cache without those instructions or data being used. Hence, such an over-prediction would not result in an architecturally incorrect result.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Particular configurations will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included, e.g. between the decode stage 10 and issue stage 12, for mapping architectural registers specified by program instructions or micro-operations to physical register specifiers identifying physical registers in the register file 14.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. A memory management unit (MMU) 28 is provided to perform memory management operations such as address translation and checking of memory access permissions. The address translation mappings and access permissions may be defined in page table structures stored in the memory system. Information from the page table structures can be cached in a translation lookaside buffer (TLB) provided in the MMU 28.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness. The decode stage 10 and execute stage 16 are examples of the instruction decoding circuitry and processing circuitry mentioned earlier.

As shown in FIG. 1, the apparatus 2 includes a branch predictor 40 for predicting outcomes of branch instructions. The branch predictor 40 is looked up based on addresses of instructions to be fetched by the fetch stage 6 and provides a prediction of whether those instructions are predicted to include branch instructions, and for any predicted branch instructions, a prediction of their branch properties such as a branch type, branch target address and branch direction (the branch direction indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Branch misprediction detection circuitry 46 detects, based on outcomes of branch instructions executed by the branch unit 24, whether a branch has been mispredicted, and controls the pipeline 4 to suppress effects of the mispredicted branch instruction and cause execution of instructions to resume based on the correct branch outcome (e.g. by flushing operations that are younger than the branch in program order and resuming fetching from the instruction that should be executed after the branch). The prediction state data in the BTB 42 and branch direction predictor 44 is trained based on the outcomes of executed branch instructions detected by branch misprediction detection circuitry 46. As discussed further in the examples below, the number of iterations of a predicated loop that are signalled to the processing circuitry may be predicted based on a class prediction that is stored in the BDP 44. Entries in the BDP 44 may be provided with an additional bit indicating whether that entry corresponds to a class-based prediction of the number of loop iterations or to a regular branch prediction predicting taken/not-taken outcome for a branch instruction.

Figure 2:
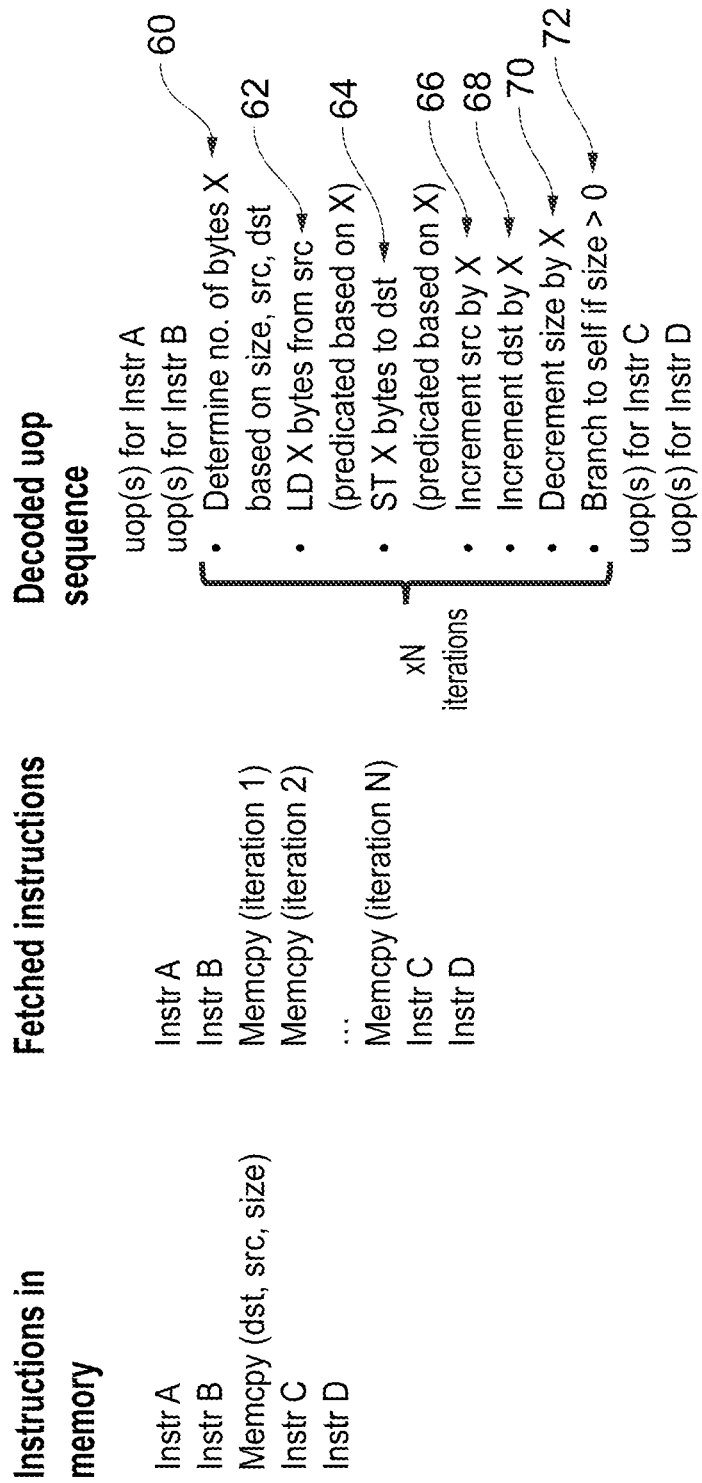
FIG. 2 illustrates an example of executing code including a memory copy (memcpy) instruction.

FIG. 2 illustrates processing of a memory copy instruction for copying data from a first memory region to a second memory region. The memory copy instruction is a particular example of a predicated-loop-body instruction as mentioned earlier. In this example, the memory copy instruction also serves as the predicated-loop-terminating branch instruction mentioned earlier.

The memory copy instruction specifies a source address src identifying a first region of memory and a destination address dst identifying a second region of memory, as well as specifying a size parameter which identifies the number of bytes of data to be copied from the first region of memory to the second region of memory. Any addressing mode may be used to identify the address operands (e.g. using an absolute address, or as a relative address specified using an operand defining an offset, which could be specified relative to a base address stored in a register 14 or relative to an instruction address of the memcpy instruction itself). The left-hand portion of FIG. 2 shows a sequence of program instructions as they would be stored in memory prior to being fetched by the fetch stage 6. A single instance of the memory copy instruction is included surrounded by a certain number of other instructions A, B, C, D.

Although the size parameter of the memory copy instruction may specify a certain total number of bytes to be copied, that size may be greater than the maximum number of bytes that can be copied in a single instance of executing the memory copy instruction, and so the memory copy instruction may be interpreted as an implicit branch instruction which, if the number of bytes copied in response to a particular instance of the memory copy instruction is such that there are still some bytes remaining of the total number of bytes to be copied, then the memory copy instruction triggers a branch to itself, so that a further instance of the memory copy instruction is executed to represent a further iteration of a predicated loop (the size parameter can be decremented by the number of bytes processed on each iteration of the memory copy instruction to track how many bytes remain to be processed, and the source/destination addresses of the memory copy instruction can be incremented by the number of bytes processed so that each iteration of the memory copy instruction moves onto the next chunk of data in memory after the chunk processed in the previous iteration).

The branch predictor 40 can predict how many iterations of the memory copy instruction will be required before the loop terminates, so that it can control the fetch stage 6 to fetch the memory copy instruction the predicted number of times before moving onto the next instruction after the memory copy instruction. For example, the branch predictor 40 can use the predicated loop prediction structure 48 to detect whether the loop should be terminated at a given iteration of the loop. If the number of iterations of the memory copy instruction is mispredicted, the branch misprediction detection circuitry 46 may (sometimes) trigger a flush of incorrectly scheduled micro-operations which should no longer be executed, and control the pipeline 4 to resume fetching operations from after the mispredicted branch, including fetching more instances of the memory copy instructions if required.

Hence, the middle portion of FIG. 2 shows the fetched sequence of instructions fetched by the fetch stage 6 when the program instruction stored in memory are executed. Note that, in the fetched instruction sequence as shown in the middle portion of FIG. 2, all of the instances of the memory copy instruction shown are actually different fetched instances of the same instruction fetched from the same instruction address, where the branch predictor 40 has predicted that N iterations of the loop will be needed before the loop termination condition occurs (which in this case is when the size parameter indicates that the number of remaining bytes to be processed has reached zero).

The right-hand portion of FIG. 2 illustrates a decoded sequence of micro-operations generated by the decode stage 10 corresponding to the fetched instruction sequence shown in the middle part of FIG. 2. For a given instance of fetching the memory copy instruction for a particular iteration of the memory copy loop, that instance of the memory copy instruction is mapped by the decode stage 10 to a group of multiple micro-operations 60-72 which collectively implement a single iteration of the memory copy loop. Hence, in the example shown in FIG. 2 where N iterations of the memory copy loop are required, there will be N sets of the group of micro-operations 60-72 illustrated with the bracket (FIG. 2 only shows one iteration of these micro-operations for conciseness).

The micro-operations generated for a particular iteration of the memory copy loop include at least one micro-operation 60 to determine a variable number of bytes X based on the size parameter, the source address and/or the destination address (while FIG. 2 shows a single micro-operation 60, other implementations may need more than one micro-operation to assess the addresses and calculate the number of bytes). The number of bytes X may be selected so as to not exceed the number of bytes indicated by the size parameter, which may indicate a maximum number of bytes allowed to be copied in response to the current iteration of the memory copy loop. However, the micro-architecture of the processing circuitry 16 may have the flexibility to vary the number of bytes X selected, depending on micro-architectural implementation choice. In general, the particular value selected for X can vary from implementation to implementation (e.g. some implementations may support a greater maximum size for X than others) and between different iterations of the memory copy loop, even when all the operands (destination address, source address, size) are the same. This flexibility is possible because the update made to the size parameter and source/destination memory addresses in response to the current iteration of the predicated loop will account for the number of bytes that have actually been copied and then this will cause the operation of subsequent iterations of the memory copy loop to be adjusted accordingly so that the overall effect of the loop as a whole can be the same even if the particular number of bytes processed in a particular iteration varies.

For example, the variable number of bytes X could be determined based on the alignment of the source address and/or the destination address with respect to an address alignment boundary. The memory system 34 may be able to handle memory accesses more efficiently if a request is made specifying an address which is aligned to an address alignment boundary than when an unaligned access to a block of data which spans an address alignment boundary is requested. This is because some internal control mechanisms of the memory system, such as control logic and queues associated with a cache, interconnect or memory controller, may assume that requests specify an address aligned to an address boundary corresponding to an address block of a certain size such as a certain power of 2 number of bytes, and so if a block of data crossing such an address alignment boundary has to be accessed, then the load/store circuitry 26 may split the memory access into a number of separate requests each specifying a portion of data which does not cross the address alignment boundary.

For the memory copy loop, if the source/destination address is unaligned for the first iteration of the memory copy loop, and each iteration selects as the number of bytes X the maximum possible number of bytes that can be processed in one iteration, the source/destination address after the update performed in that iteration may still be unaligned, so the next iteration would then also make an unaligned access. Hence, if each iteration requires an unaligned access, this may increase the overall number of requests that need to be made the memory system because on each iteration of the memory copy loop an access to an unaligned block may require multiple separate memory access requests to be issued to memory. In contrast, if most iterations of the memory copy instruction can perform an aligned access then this may only require one memory access request to be issued per iteration, which can reduce the total amount of memory bandwidth consumed by the accesses to memory and hence improve performance.

Therefore, it can be useful on the first iteration of the memory copy loop, if the source address or destination address is unaligned, to select the variable number of bytes X so that, even if the hardware would be capable of handling an access to a greater number of bytes in the current iteration, X is selected so that for a subsequent iteration of the memory copy loop at least one of the source address and the destination address becomes an aligned address aligned to an address alignment boundary. For example, X may be selected based on the difference between the source address and the address representing the next address alignment boundary after the source address, or based on the difference between the destination address and the address representing the next address alignment boundary after the destination address. In cases where the alignment of the source address relative to an address alignment boundary is different compared to the alignment of the destination address relative to an address alignment boundary, it may not be possible to align both the source and destination addresses to the alignment boundary for the next iteration of the memory copy loop, and so in that case some implementations may choose to prioritise the load alignment and other implementations may choose to prioritise the store alignment.

Figure 3:
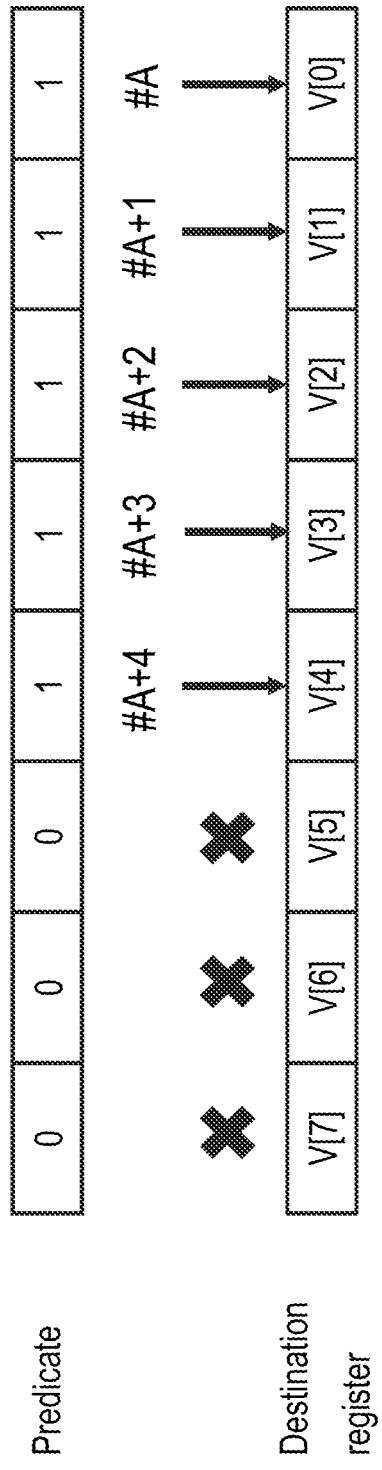
FIG. 3 illustrates an example of a predicated load micro-operation.

Also, the micro-operations generated for a particular memory copy instruction iteration include a predicated vector load micro-operation 62 which loads a destination vector register with at least X bytes of data obtained from memory system locations identified based on the source address src. FIG. 3 illustrates an example of the predicated vector load micro-operation 62. The destination register of the load micro-operation comprises a number of vector elements (e.g. 8 vector elements V[0] to V[7] in this particular example), and the source address src (assumed to be equal to #A in this example) identifies the data to be loaded to the first of the vector elements, V[0], with the subsequent vector elements being loaded with data associated with addresses which are generated by applying successive address increments to the address #A specified by the source address parameter. In this example, the increment between the addresses associated with two adjacent vector elements is 1 byte, but it would also be possible for predicates to be applied at a granularity larger than 1 byte. The predicate operand specifies which vector elements are active and which vector elements are inactive. For example, the predicate can be represented as a mask for which bit values equal to 1 indicate the positions of the active vector elements in the destination register and bit values equal to 0 indicate the positions of the inactive vector elements. In this example, the first five elements of the vector are active and the remaining three elements are inactive, indicating that vector elements V[5] to V[7] should have the corresponding load operations suppressed. Hence, if the micro-operation 60 had determined that the number of bytes X to load equals 5 then the predicate could be generated as shown in FIG. 3 to indicate that 5 bytes of data should be loaded to the first five elements of the vector.

As shown in FIG. 2, the set of micro-operations generated for a given memory copy instruction also includes a predicated vector store micro-operation 64 which stores the variable number X of bytes from a source register (which can be specified to match the destination register used by the load micro-operation 62) to memory system locations identified based on the destination address (again, the address corresponding to each vector element of the source vector register can be identified based on applying address increments to the destination address). Similar to the load micro-operation shown in FIG. 3, a predicate operand can be generated to predicate the store operations and ensure that the data from active elements of the store source register are saved to memory while store operations are suppressed for the inactive vector elements. The number of active elements indicated by the predicate operand may be determined based on the number of bytes X determined by micro-operation 60. The store micro-operation 64 may share the same predicate operand as the load micro-operation 62.

Hence, the combination of the load micro-operation 62 and the store micro-operation 64 can implement the required memory copy operation to copy X bytes of data from the source memory region to the destination memory region. The loop of decoded micro-operations then includes a number of micro-operations for maintaining the address and size parameters of the memory copy instruction to account for the number of bytes of data which have already been processed. Micro-operations 66, 68 increment the source address and the destination address respectively by X, the copied number of bytes, so that the source and destination addresses for a subsequent iteration of the memory copy loop will be advanced in memory by X bytes. Also, micro-operation 70 is generated which causes the size parameter of the memory copy instruction to be decremented by X, so that the number of bytes of data remaining to be copied can be indicated to be X bytes fewer than was the case for the current iteration. It would be readily apparent to the skilled person that micro-operations 66-70 are merely one way in which the updates to the source and destination address can be applied and that alternative micro-operations could be implemented based on the particular design of the micro-architecture that could be used to achieve a same result.

The set of micro-operations for a given instance of the memory copy instruction also includes a branch micro-operation 72 which performs a conditional branch to the instruction address of the memory copy instruction itself, with the branch being taken if the size parameter after the update performed by micro-operation 70 is greater than 0 and the branch being not taken if the size parameter is 0. That is, this branch is conditional on whether the loop termination condition for the loop is satisfied. Although not shown in FIG. 2 for conciseness, in some instruction set architectures there may also be a need for an intervening compare instruction between micro-operation 70, 72 to compare the size parameter with 0 and set a condition status flag accordingly, which the branch micro-operation 72 can used to determine whether to take the branch.

Hence, each iteration of the memory copy loop may perform the memory copy operation for a certain number of bytes X which is limited, as a maximum, to the number of bytes indicated by the size parameter but is allowed to be smaller, and then the determined number of bytes are copied from source region of memory to a destination region of memory and the addresses and size parameter are updated accordingly and if it is still necessary to perform a further iteration of the loop because there is at least one remaining bytes to be copied then a branch to the memory copy instruction itself is triggered. In other examples, the operations indicated by micro-operations 60-72 could have been represented by separate program instructions in the representation of the program stored in memory, rather than being cracked by the instruction decoder 10 from a single memory copy instruction.

Memory copy (memcpy) functions are one example where such a predicated loop of operations can be useful. However, there are also other library functions in programming languages such as C for which a similar technique can be useful. For example, the string.h C library functions for string processing can be implemented using a similar iterative technique where a certain operation is performed on a variable number of bytes and a loop is iterated a number of times until the required number of bytes have been processed. In the memory copy example, the predicated vector load micro-operation 62 is followed by a predicated vector store micro-operation 64, but other string processing functions could have a different operation after the predicated vector load micro-operation 62.

For example, the memcmp( ) function, which is for comparing N bytes of two strings to determine whether they are the same, may provide a predicated vector compare micro-operation instead of the vector store micro-operation 64. The predicated vector compare operation may perform an element-by-element comparison of the vector loaded by the load micro-operation 62 with a second vector representing a string to be compared (e.g. each element of the two vectors may represent one character of the respective strings), and a comparison result may be set depending on the comparison outcomes of each pair of active elements within the two vectors (and depending on the comparison outcome of any preceding iteration of the loop). A predicate operand (generated based on the variable number of bytes determined at micro-operation 60) can be used to ensure that the comparison outcomes for any inactive elements do not contribute to the comparison results.

Another example of a string processing function which could use a similar approach is the strlen( ) function which detects the length of string stored at a particular region of memory, by loading the string from memory and searching for the position of the first byte of data having a value of 0 after the start of the string. This can be implemented using a loop as shown in FIG. 2 where the vector load 62 loads a portion of the string from memory and a subsequent vector comparison instruction performed instead of the store micro-operation 64 compares each of the loaded bytes of data against 0. Again, a predicate operand can be used to predicate the load operation so that the number of bytes X processed in a given iteration may be selected so as to cause the source address for the next iteration to be an aligned address to improve performance, and this predicate operand may then also predicate the subsequent compare micro-operation to ensure that the overall comparison results does not incorrectly depend on data within an inactive element of the vector.

Another example of a string processing function which could use a similar approach is the memset( ) function which sets each byte within a given destination region of memory to a certain predetermined value, where the number of bytes updated in the destination region of memory is determined based on a parameter of the instruction, and again an iterative approach can be used where each iteration determines a certain number of bytes X to be processed (e.g. based on the maximum size supported for the memory transaction, the number of remaining bytes, and address alignment), and then issues a predicated store predicated based on the determined number of bytes X, before updating the store address and the number of remaining bytes parameter based on the variable number of bytes X processed in that iteration, and then conditionally branching for another iteration of the loop body if there is still at least one further byte remaining to be processed. For memset( ) there would be no need for the predicated loop body to include the predicated load micro-operation 62 shown in FIG. 2.

It will be appreciated that these are only some examples of processing functions which could use the technique discussed below. Although FIG. 2 shows an example where the micro-operations for a given iteration of the predicated loop body are generated by the instruction decoder 10 in response to a single combined instruction, it would also be possible in other implementations for the operations of the predicated loop body to be defined a separate program instructions in the representation of the program code stored in memory. Also, while FIG. 2 shows an example where the instruction that controls the performance of all or part of the predicated loop body also triggers the conditional branch depending on whether the loop termination is satisfied, it would also be possible for the conditional branch on each iteration of the predicated loop body to be performed in response to a micro-operation generated in response to a separate branch instruction included in the program code stored in memory separate from the instruction implementing the predicated loop body of the memcpy or other string processing function.

Memory copy functions and other string processing functions are some of the most common library functions to be used by software applications. Applications using these functions can therefore see a significant performance improvement if processing of these functions can be accelerated. Including a dedicated program instruction in the instruction set architecture, such as the memcpy instruction shown in FIG. 2, can help to reduce the overhead of fetching instructions from the cache or memory, although this is not essential and as mentioned above it would also be possible to promote these functions using a number of separate program instructions. Nevertheless, the performance achieved for such instructions may depend on the way in which branch prediction is handled for these instructions, because the branch predictor 40 may need to predict how many iterations of the operations associated with the predicated loop body are to be fetched and issued for execution. This depends on prediction of the outcome of a predicated-loop-terminating branch instruction, such as the memcpy instruction shown in FIG. 2 or a separate conditional branch instruction following the instruction(s) of the predicated loop body of such a predicated loop, and that outcome may be relatively hard to predict because the point at which the loop terminates may be affected both by memory address alignment and copy data size (the total number of bytes required to be processed, as specified by the remaining bytes parameter provided for the first iteration of the loop).

Typically, the processing circuitry 16 can adjust the number of bytes X selected for copying in a given loop iteration based on load/store address alignment, because modern CPUs generally prefer to load/store data with a certain aligned address (e.g., 16-byte aligned, or aligned to some other boundary associated with a block size corresponding to a certain power-of-2 number of bytes). To force this alignment, the memcpy function in the predicated loop body can copy a small number of bytes instead of processing entire word in the first iteration, so that the address for the next iteration becomes aligned.

For example, in the case of memcpy(dst, src, 30), the number of iterations for the entire memcpy loop can vary based on the address alignment (assuming 16-byte alignment in this example):
(a) Src=0x100
   Iter-1: Copy 16 bytes//after iter-1, src=0x110, remaining size=14
   Iter-2: Copy 14 bytes (b) Src=0x1fc
   Iter-1: Copy 4 bytes//after iter-1, src=0x200, remaining size=26
   Iter-2: Copy 16 bytes//after iter-2, src=0x210, remaining size=10
   Iter-3: Copy 10 bytes The application may see further divergence when input size is different (e.g. size=10 and size=100 will cause different control flow).

Therefore, the total number of iterations required can diverge significantly depending on the data-dependent inputs to the predicated loop function, which makes predicting the outcome hard for the branch prediction circuitry. As shown in FIG. 1 the branch predictor 40 may have a predicated loop prediction structure 48, which can be used to predict whether a given iteration of the loop terminating branch within the predicated loop will terminate the loop. A number of entries may be maintained, indexed based on an instruction address associated with an instruction corresponding to the loop, such as the memcpy instruction shown in FIG. 2. Each entry could track, for example, the predicted number of total iterations of the loop, or in other examples could correspond to a specific iteration of the loop and indicate whether the loop terminating branch on that iteration is predicated to be taken or not taken. While such a predicated loop prediction structure 48 can help to partially reduce the number of branch mispredictions for such predicated loops, there may still be a significant number of mispredictions because the number of required iterations may vary for some loops from one instance to another based on the size and address alignment of the operands, and so the behaviour learned from a previous instance of the loop may no longer be accurate. Some techniques for reducing the latency penalty associated with such branches are discussed below.

Figure 4:
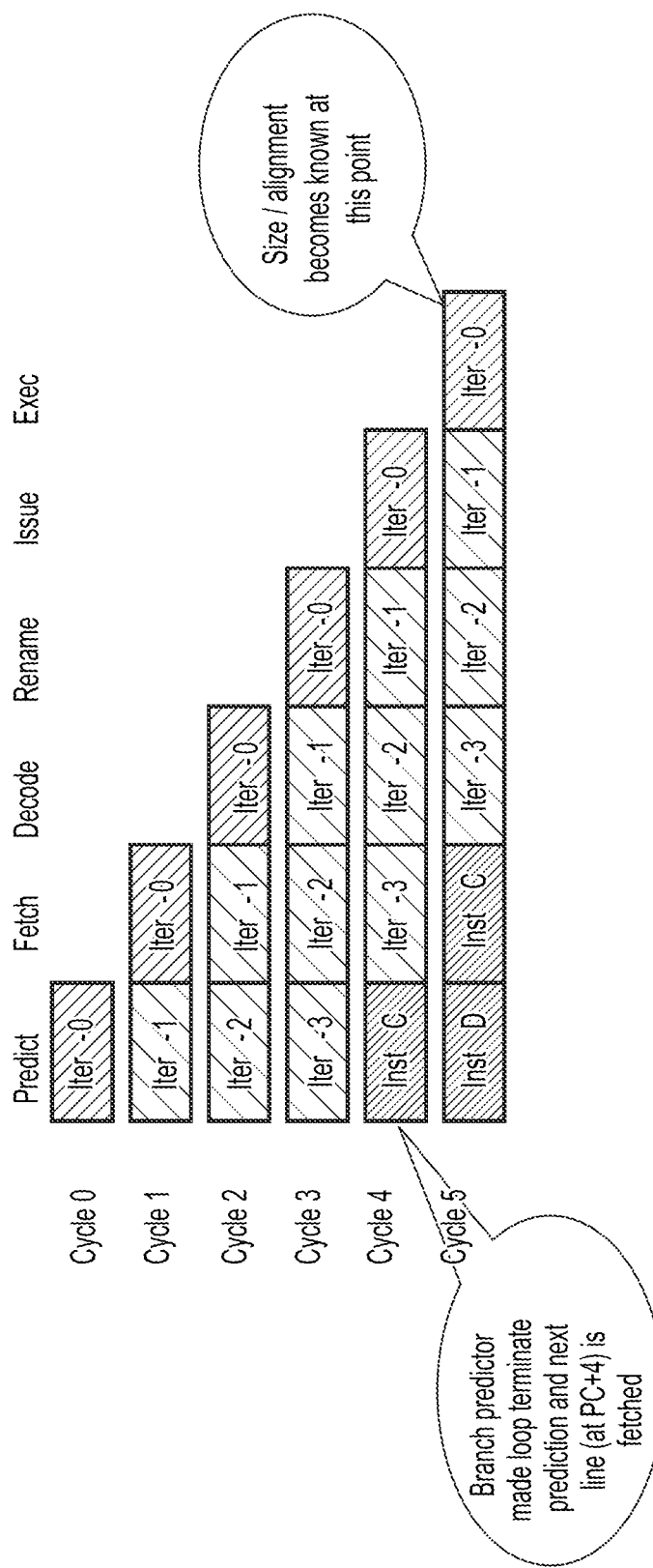
FIG. 4 is a pipeline diagram illustrating processing of a number of iterations of a predicated loop body.

FIG. 4 shows a general pipeline diagram illustrating processing of a number of iterations of the predicated loop body using a processing pipeline having a number of pipeline stages. In this example the pipeline stages include: a prediction stage corresponding to the operation of the branch predictor 40, the fetch stage 6, the decode stage 10, a register renaming stage (not illustrated in the example of FIG. 1) at which architectural register specifiers specified by the decoded instructions are mapped (renamed) to physical register specifiers identifying registers 14 provided in hardware (other examples may omit the register renaming stage); the issue stage 12; and the execute stage 16. Of course, this is just one example of a possible set of pipeline stages.

Instructions or micro-operations associated with each iteration of the loop progress from stage to stage of the pipeline so that while the instructions or micro-operations associated with an earlier iteration are at a later stage of the pipeline, the instructions or micro-operations associated with a later iteration can be processed at an earlier stage of the pipeline. In this example, for conciseness it has been assumed that the operations performed at a given stage for a given iteration of the predicated loop can be completed in one processing cycle (even if the processing operations corresponding to that iteration are mapped to multiple micro-operations by the decode stage 10). It will be appreciated that other implementations could take more than one cycle for some stages and so the particular timings shown in FIG. 4 are just one example.

In cycle 0, the branch predictor 40 receives, as an address for which a branch prediction should be made, an address of an instruction corresponding to iteration 0 of the loop, and predicts that the loop termination condition will not be satisfied so that a further iteration, iteration 1, will be required. Similarly, the branch predictor 40 continues to predict that the loop termination condition will not be satisfied for subsequent iterations, until when predicting the outcome of iteration 3 the determination condition is predicted to be satisfied, so that the prediction is that after iteration 3 is complete, the next instruction should be instruction C which follows the loop (as instruction C is the instruction following the memcpy instruction in the example of FIG. 2). Based on these predictions the branch predictor 40 controls the fetch stage 6 to fetch the required number of iterations of the instructions corresponding to the program loop body (e.g. a single memcpy instruction per iteration in the example of FIG. 2), and the subsequent stages then carry out their respective functions of decoding, renaming (if supported) and issuing, before the decoded micro-operations reached the execute stage for iteration 0 in cycle 5 in this particular example. At the point when the micro-operations corresponding to iteration 0 reach the execute stage 16, the operands for the micro-operations in iteration 0 are available, for example, the size parameter which determines the number of remaining bytes to be processed and the address for which the load/store is to be performed become known. These parameters can be used to determine whether the conditional branch for iteration 0 should have been triggered, and so at this point the branch misprediction detection circuitry 46 can determine whether the branch prediction for iteration 0 was correct.

Figure 5:
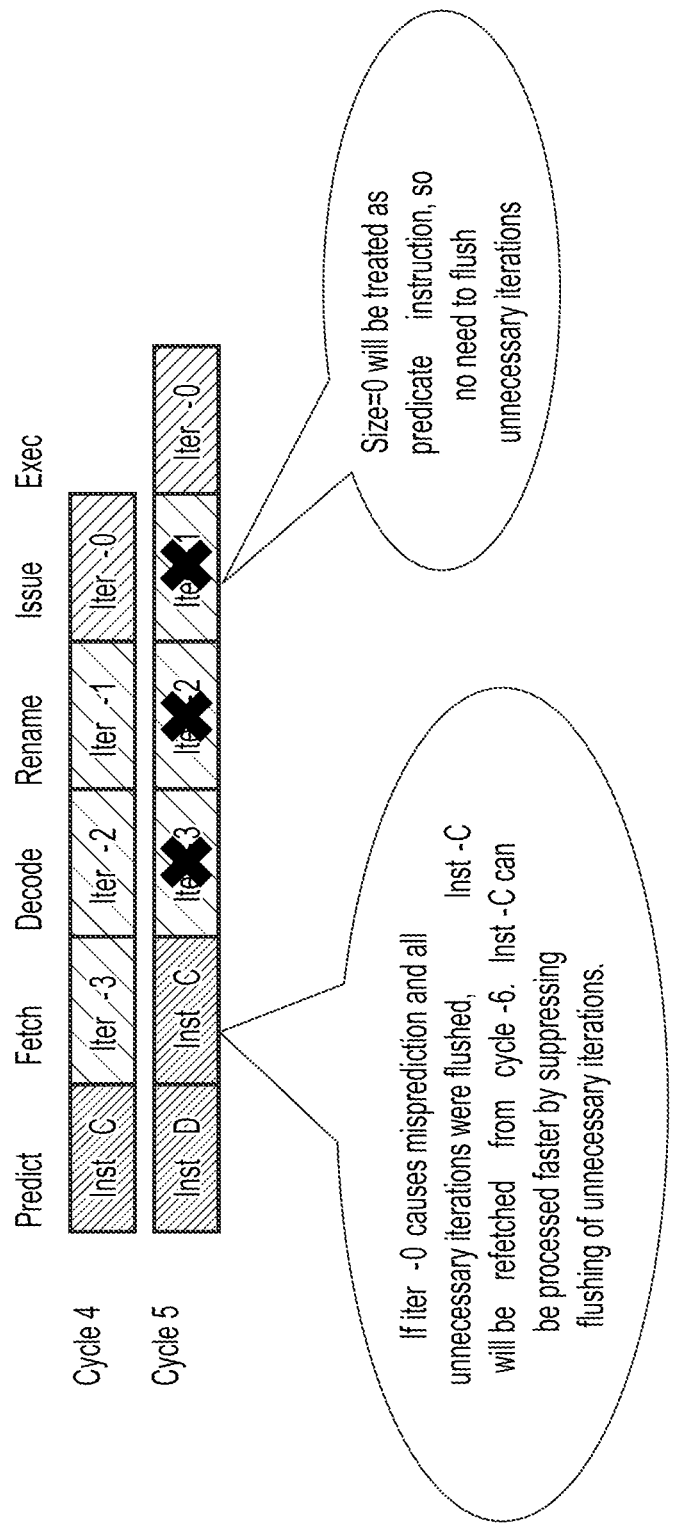
FIG. 5 is a pipeline diagram illustrating suppression of flushing of unnecessary iterations of the predicated loop body.

Normally, if it is now determined that a branch prediction was incorrect, the response taken by the branch misprediction detection circuitry 46 would be to flush the pipeline of any operations which are younger than the micro-operation for which the misprediction occurs, and so if iteration 0 is mispredicted as shown in the example of FIG. 5, one would normally expect to flush the micro-operations associated with iterations 1, 2, 3 which were unnecessary iterations which should not have been fetched. Normally, after triggering such a flush, fetching of instructions may then resume from the correct instruction which should have executed after the mispredicted branch.

However, in the example of FIG. 5, if a flush was triggered in response to the misprediction arising for iteration 0, this would flush the pipeline of all the remaining younger micro-operations after iteration 0, and re-fetching of the instructions to be processed after the branch would then commence in cycle 6 after the cycle 5 in which the branch misprediction was identified. In the example shown in FIG. 5, the correct number of loop iterations to be executed for the predicated loop should have been 1, so that the following instruction C should have been executed directly after the operations associated with iteration 0 of the predicated loop.

As shown in FIGS. 4 and 5, at the point when the branch misprediction is identified in cycle 5 when the micro-operations for iteration 0 reach the execute stage, the following instruction C may already have been fetched and be resident within the pipeline. Therefore, the following instruction C to be processed based on the correct branch prediction outcome can be processed faster by not flushing micro-operations after the mispredicted branch for iteration 0, but instead allowing the unnecessary loop iterations 1, 2, 3 to remain in the pipeline without being flushed. This is possible because the nature of the predicated loop body is such that if it is executed unnecessarily following a mispredicted-non-termination branch misprediction when the loop termination condition was predicted to be not satisfied when it should have been satisfied, then in any case the predication used for the operations within the predicated loop body means that the architectural effects of the unnecessarily executed operations will be suppressed. Using the example shown in FIG. 2, for instance, if an unnecessary loop iteration is carried out then the size parameter supplied for that iteration will be 0 (since if the correct outcome of the loop termination condition evaluation in the preceding iteration was that the loop should have terminated, this implies that the size was equal to 0 at the end of that iteration). If the size parameter is 0, then the load/store operations will be predicated to suppress the effects of the load/store (e.g. the destination register of the load will not be updated with data loaded from memory, and issuing of store requests to memory may be suppressed for the store operation when the predicate indicates that all the elements of the vector are inactive because the required number of bytes to be stored is 0). Similarly, incrementing the address parameters by X and decrementing the size by X will have no architectural effect if X=0. Therefore, it is possible to allow the micro-operations corresponding to unnecessary loop iterations fetched following a branch misprediction to remain without being flushed. By suppressing the flushing of the unnecessary iterations, the next instruction can be processed faster.

FIG. 5 shows an example where the branch predictor over-predicted the required number of loop iterations, leading to some unnecessary loop iterations being fetched for processing.

Figure 6:
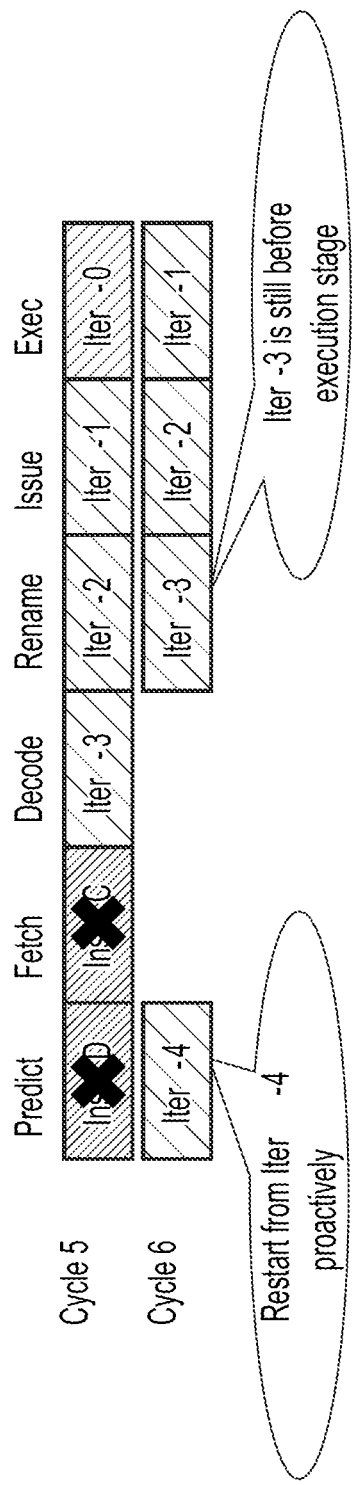
FIG. 6 is a pipeline diagram illustrating early flushing of iterations of the predicated loop body.

However, as shown in FIG. 6 it is also possible for a branch misprediction to cause insufficient loop iterations to be fetched for processing. For example, in FIG. 6 the branch predictions were correct for iterations 0, 1 and 2, but when making the prediction of whether the loop termination was satisfied for iteration 3, the branch predictor 40 predicted that the loop termination condition would be satisfied when it actually should not have been satisfied, so the fetch stage 6 fetched the next instructions C, D when a further loop iteration Iter-4 should have been fetched. Hence, the following instructions C, D fetched into the pipeline based on the loop termination prediction predicted for iteration 3 should be flushed and fetching should resume from iteration 4 so that at least one further iteration of the predicated loop body will be processed.

Normally, one would expect that branch mispredictions would be resolved when the mispredicted instruction or micro-operation reaches the execute stage 16 at which the operands of that instruction or micro-operation become available. Therefore, in a typical approach in the scenario shown in FIG. 6, one would expect that the branch misprediction for iteration 3 would be resolved when iteration 3 reaches the execute stage 16. However, for predicated loops of the type shown in FIG. 2, it is recognised that the total number of required loop iterations can be deduced from the operands provided for the very first iteration of the loop (in this case, iteration 0). For example, the total number of iterations can be deduced from the size parameter and load/store address provided for the first iteration of the loop and an indication of the maximum number of bytes that can be processed in a single iteration. Some circuit logic may be provided to analyse the address alignment and the size parameter and use this to calculate how many loop iterations will be required in total. For example, for the examples (a) and (b) provided above, this circuit logic may determine that the required number of iterations is 2 and 3 respectively. Hence, at the time that the first iteration 0 reaches the execute stage, the branch misprediction detection circuitry 46 can already detect whether any of the subsequent iterations have been mispredicted by the branch predictor 40, even though the micro-operations for those subsequent iterations have not yet reached the execute stage 16. If the mispredicted iteration is iteration 3, say, there is no need to wait for the corresponding micro-operations associated with iteration 3 to reach the execute stage before triggering the flush of the incorrectly fetched instructions C, D, and instead a flush can be initiated early, where rather than flushing all operations younger than the micro-operation currently at the execute stage 16, the flush can flush from the pipeline the operations which are younger than the micro-operations corresponding to the mispredicted iteration 3, which in the example of FIG. 6 is currently at the rename stage.

This early flushing of operations is possible because the nature of the predicated loop is such that the total number of micro-operations generated by the instruction decoding stage 10 per loop iteration remains fixed for every loop iteration, so that based on the loop iteration currently at the execute stage and the number of further iterations expected before the iteration which was mispredicted, the branch misprediction detection circuitry 46 can identify an instruction identifier or other indication associated with the point of program flow beyond which instructions or micro-operations should be flushed from the pipeline, even if the branch misprediction detection circuitry 46 does not currently have those instructions or micro-operations available at the execute stage. For example, if the fixed number of micro-operations performed per loop iteration is M and the micro-operation identifier associated with the iteration 0 at the execute stage when the branch misprediction for a subsequent iteration is identified is uid, and it is assumed that the instruction decoder will sequentially allocate micro-operation identifiers in an order corresponding to the program order as it generates micro-operations, then the micro-operation identifier representing the point beyond which micro-operations should be flushed from the pipeline may be uid+N*M, where N is the number of additional iterations of the loop that were fetched after iteration 0 before the iteration which encountered the misprediction is reached (e.g. for the example in FIG. 6, N=3). Hence, with this approach, when a mispredicted-termination branch misprediction occurs, the corresponding flush of the pipeline can be initiated early even though the iteration that encountered that misprediction has not yet reached the execute stage. Again, this can improve performance because the iteration 4 which should have executed after iteration 3 can be re-fetched earlier than would be the case if the flush was not is initiated until iteration 3 which the execute stage.

Figure 7:
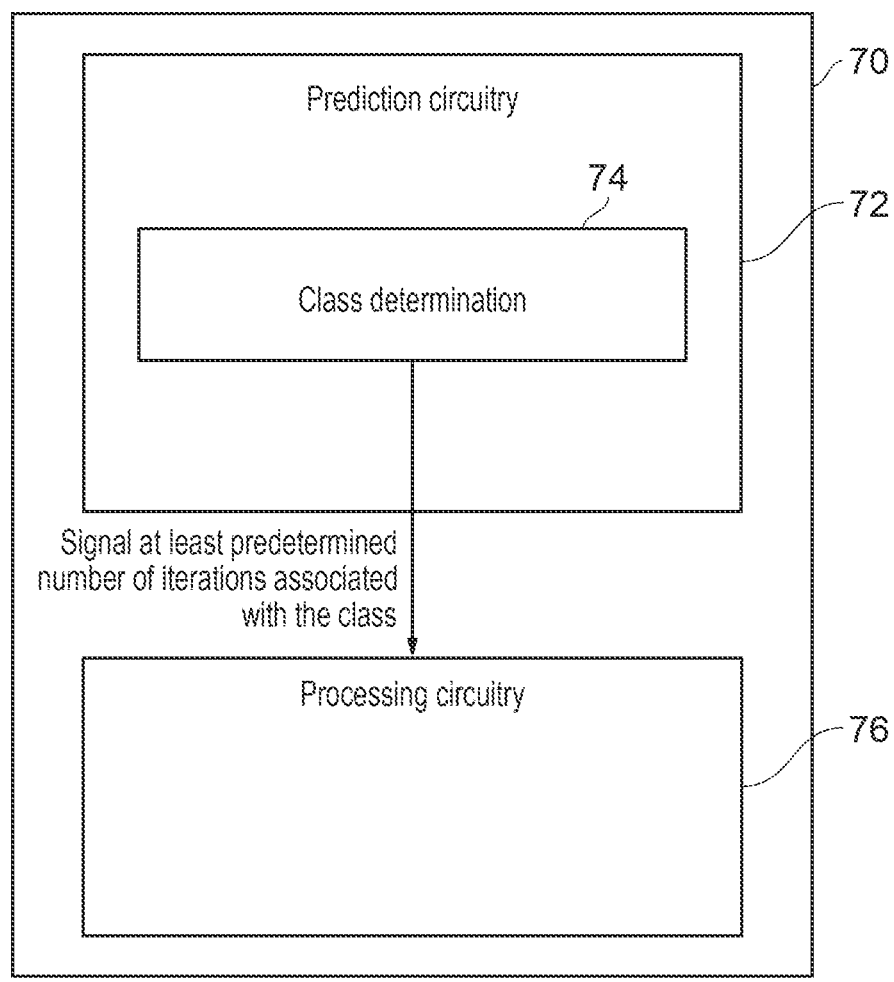
FIG. 7 schematically illustrates an example of a data processing apparatus.

FIG. 7 schematically illustrates an apparatus 70 according to various configurations of the present techniques. The apparatus 70 is provided with prediction circuitry 72 and processing circuitry 76. The prediction circuitry 72 is arranged to generate a prediction of a number of iterations of a fetching process used to control fetching of data or instruction to be used in processing operations that are predicted to be performed by the processing circuitry 76 comprises class determination circuitry 74 that is arranged to determine, for the prediction of the number of iterations of the fetching process, a class of a plurality of prediction classes and to signal a predetermined number of iterations associated with the class to the processing circuitry 76. The branch predictor 40 of FIG. 1 may be comprised within the prediction circuitry 72. The processing circuitry 76 may comprises any other functional blocks described in FIG. 1. Processing circuitry 76 is responsive to the signalled predetermined number of iterations to trigger at least that number of iterations of the fetching process. The processing circuitry 76 is tolerant of an over-prediction of the number of iterations to provide a result that it is architecturally correct. The processing circuitry 76 and the prediction circuitry 72 may be provided as discrete logical units or may be combined within a same circuit that provides the functionality described herein in relation to the prediction circuitry 72 and the processing circuitry 76.

Figure 8:
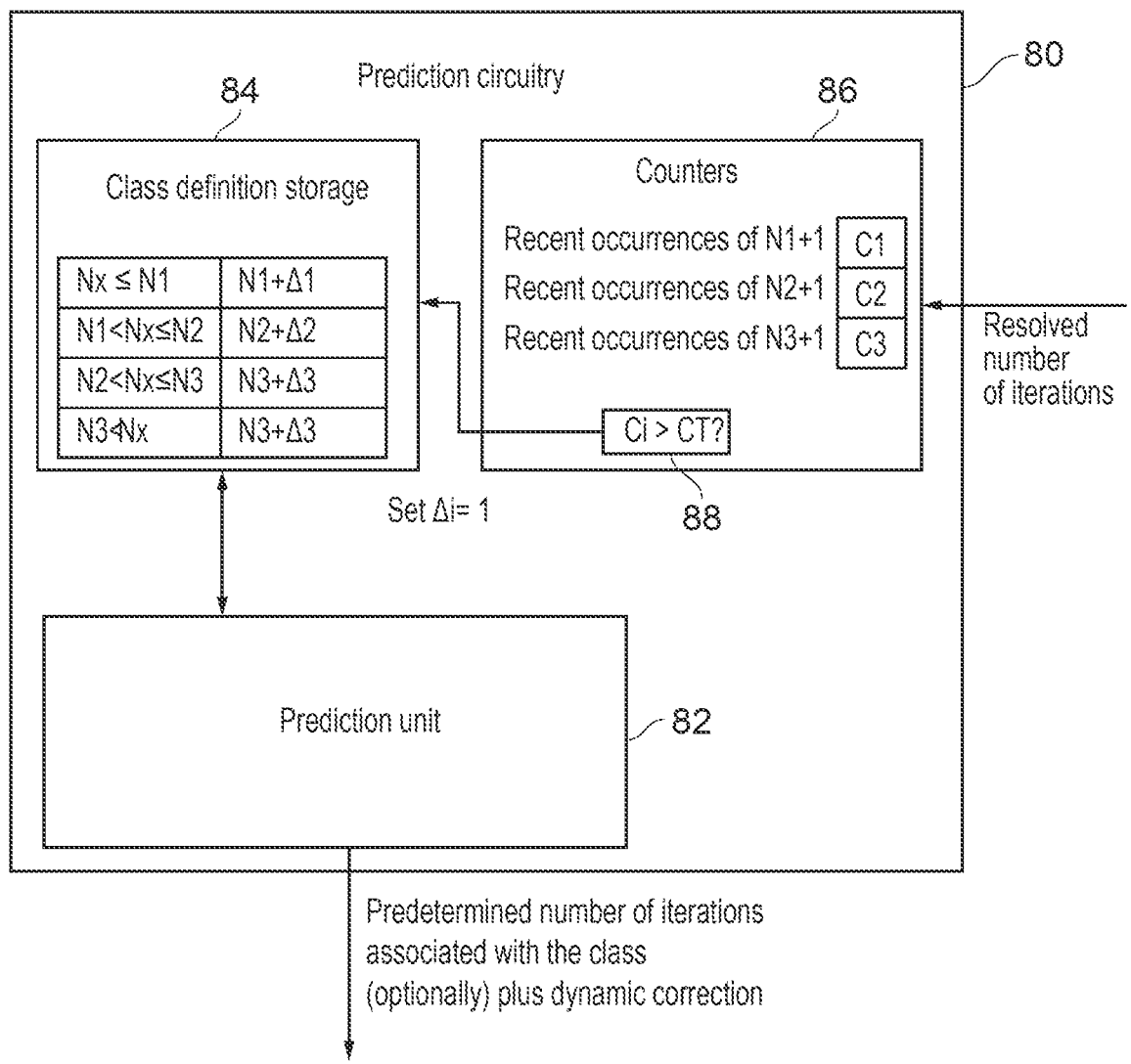
FIG. 8 schematically illustrates details of prediction circuitry.

FIG. 8 schematically illustrates details of prediction circuitry 80 according to various configurations of the present techniques. The prediction circuitry 80 is provided with class definition storage 84, counters 86 and a prediction unit 82. The prediction unit 82 is arranged to predict the number of iterations of the fetching process using the techniques described herein. In particular, the prediction unit 82 determines a class of the plurality of classes that are defined in the class definition storage 84. The class definition storage stores information indicative of four different classes C1, C2, C3, and C4. It would be readily apparent to the skilled person that the number of different classes has been chosen for exemplary purposes only and that any number of classes could be provided. The class definition storage 84 defines class 1 as comprising any number of iterations less than or equal to N1, class 2 as comprising any number of iterations greater than N1 and less than or equal to N2, class 3 as comprising any number of iterations greater than N2 and less than or equal to N3, and class 4 comprising any number of iterations greater than N3. In the illustrated example, there are four possible classes and representation of the choice of class could therefore be represented with a two bit value. The boundaries of each class can also be stored as three values (N1, N2, and N3) in the class definition storage 84. The prediction unit 82 determines a class of the predicted classes, for example, by performing a lookup in a lookup table using a current program counter value, and determines an indication of which class of the plurality of classes to use. The prediction unit 82 then performs a lookup in the class definition storage 84 to determine the predetermined number of iterations. It would be readily apparent to the skilled person that the provision of class definition storage is one of a number of options that would be available to the skilled person. In some configurations, the class boundaries and predetermined number of iterations for a given class may be fixed and hardwired into the prediction circuitry.

The prediction circuitry 80 is also provided with a sequence of counters 86 which are used to indicate a number of recent occurrences of values that fall just outside of a class boundary. The counters 86 are updated based on a resolved number of iterations which is passed to the prediction circuitry 80 from the processing circuitry. The counters 86 are configured to indicate a number of recent occurrences of resolved numbers of iterations that fall just outside the boundary. The counters themselves can be updated using any counting scheme known to the skilled person. For example, the counters could be saturating counters that are incremented for each occurrence of the resolved number of iterations that falls just outside the corresponding class boundary and could be decremented for each $K^{th}$ occurrence of any other resolved number of iterations. In the illustrated example, the counter C1 is incremented in response to occurrences of N1+1 resolved iterations, the counter C2 is incremented in response to occurrences of N2+1 resolved iterations, and the counter C3 is incremented in response to occurrences of N3+1 resolved iterations. The counter circuitry 86 also includes comparison circuitry 88 to determine if any of the counters Ci is greater than a threshold CT. If a counter Ci is greater than a threshold CT, indicating frequent occurrences of Ni+1 resolved iterations, then the comparison circuitry 88 signals the class definition storage to set a dynamic offset value $\Delta i$ to 1. In the illustrated example, if C1 is greater than CT then Δ1 is incremented to 1 and is otherwise set to 0, if C2 is greater than CT then Δ2 is set to 1 and is otherwise set to 0, and if C3 is greater than CT then Δ3 is set to 1 and is otherwise set to zero. The class definition storage 84 is arranged to modify the output, as the predetermined number of iterations, the value defined in the class definition storage modified by the dynamic offset value Δi. The predetermined number of iterations is passed to the prediction unit 82 which is then passed to the processing circuitry. Hence, the prediction circuitry 80 illustrated in FIG. 8 is able to dynamically modify the class definition based on a distribution of the resolved number of iterations of the fetch process.

Figure 9:
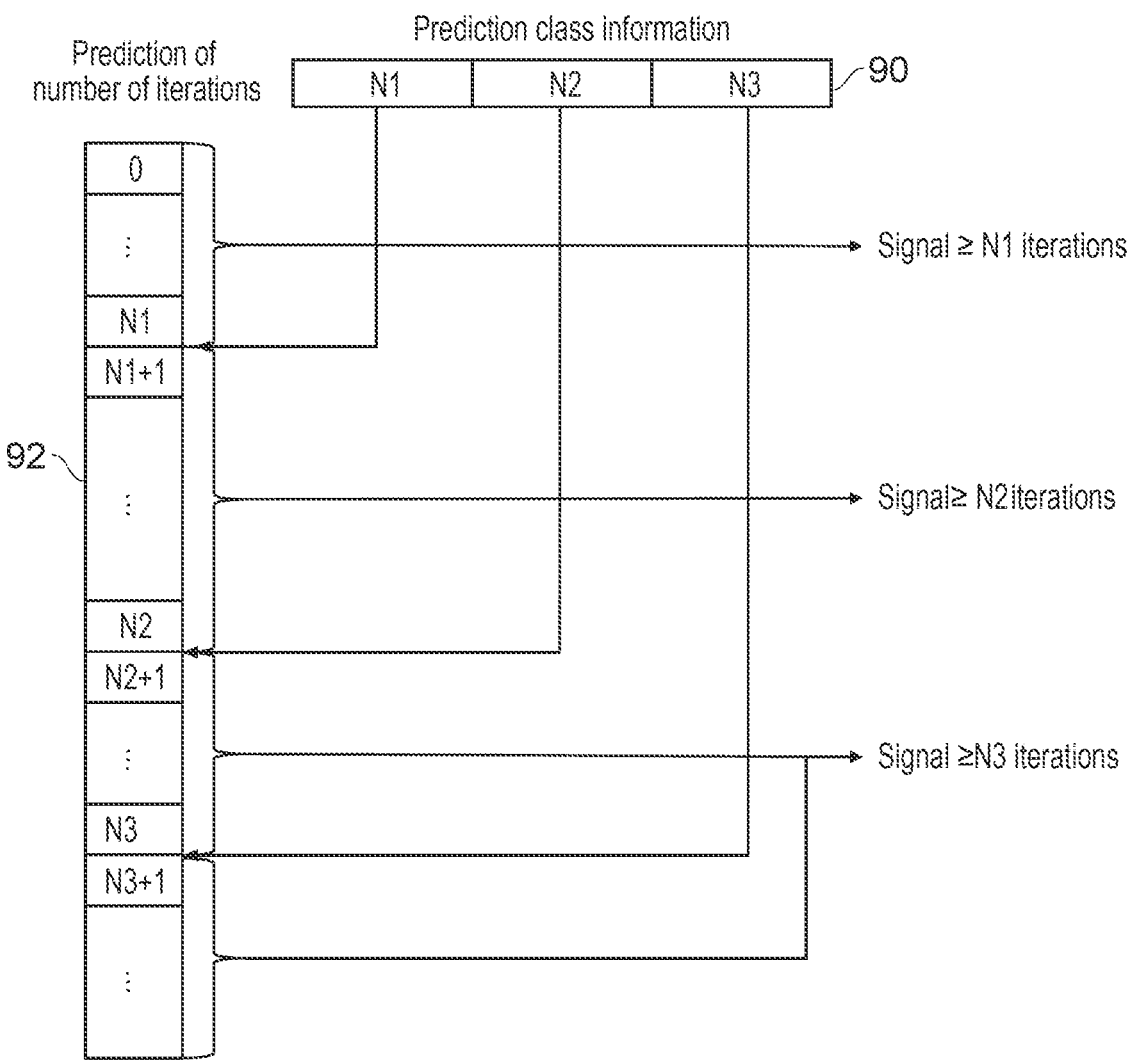
FIG. 9 illustrates the determination of a number of iterations to signal dependent on a predicted class.

FIG. 9 schematically illustrates the coarse graining that is performed by the prediction circuitry when making predictions. Rather than determining a precise number of iterations 92 with integer granularity, the prediction circuitry provides a coarse grained prediction based on prediction class information 90 that is stored in the prediction circuitry. The prediction class information contains class boundaries N1, N2, and N3 which indicate a range of numbers of values of the possible predicted numbers of iteration that are grouped into each class. Each class comprises a plurality of different values and therefore predicts the predetermined number of iterations with a coarser granularity that the total possible number of iterations 92. Based on the prediction class information, the prediction circuitry groups predictions of iterations from 0 to N1 into class 1, predictions of iterations from N1+1 to N2 into class 2, predictions of iterations from N2+1 to N3 into class 3 and predictions of iterations above N3 to class 4. The number of iterations that are signalled by the prediction circuitry is then determined based on the class boundaries. For each of class 1, class 2, and class 3, at least the maximum number of iterations that fall within that class are predicted. For class 4, the number of iterations that are predicted is defined by N3 which also provides an upper limit to the number of iterations that are predicted. Hence, the predictions that are provided by the prediction circuitry are on a more coarse grained level than the possible range of iterations 92.

Whilst the predicted number of iterations is the same for both of classes 3 and 4, in some configurations, the prediction circuitry is responsive to a prediction of any of classes 1 to 3 (i.e., any class other than the highest class), to subsequent to triggering the number of iterations, move on to triggering a subsequent fetching process, for example, a fetching process associated with a subsequent instruction in a sequence of instructions. In addition, the prediction circuitry is response to a prediction of class 4 (i.e., the highest class), to subsequent to triggering the number of iterations, to pause the fetching process without moving on to trigger subsequent fetching processes and to wait until the number of iterations is resolved by the processing circuitry. At this point the number of iterations becomes known and a correct number of further iterations can be triggered. Hence, even if both classes 3 and 4 cause the number of iterations that are predicted to be defined as N3, there may be other parts of fetching control that vary depending on which class is predicted.

Figure 10:
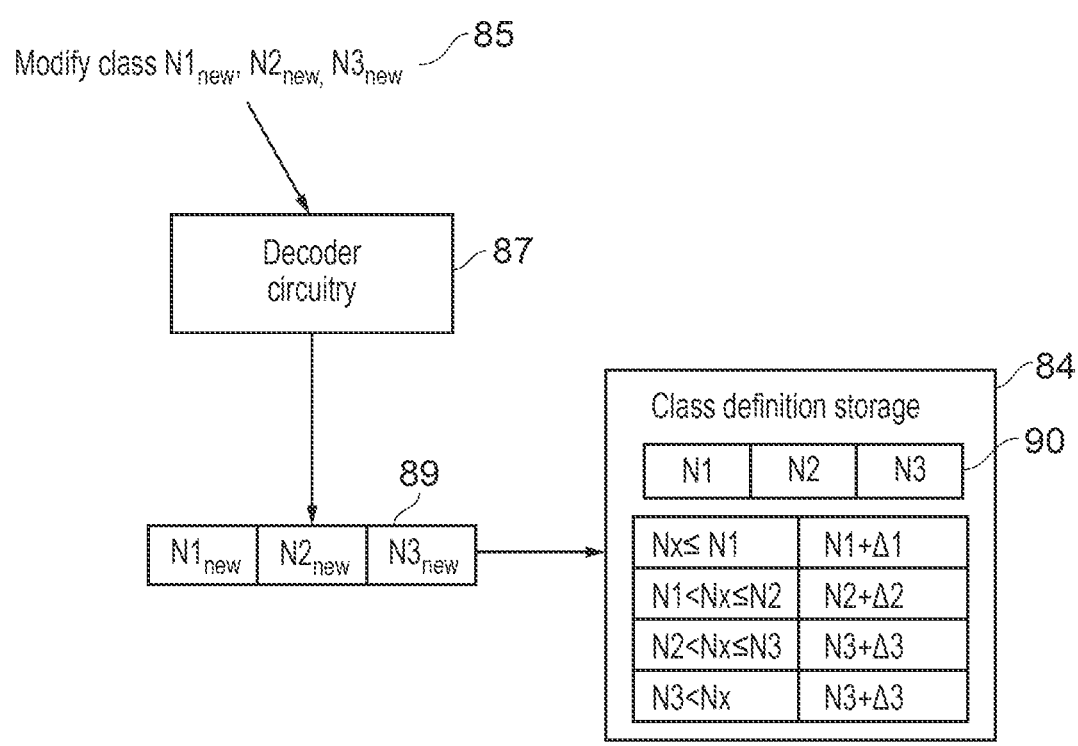
FIG. 10 illustrates the updating of a class definition using an instruction.

FIG. 10 schematically illustrates the updating of class definition 90 stored in class definition storage 84 according to various configurations of the present techniques. The update is triggered through the use of an instruction 85 that is an instruction of an instruction set architecture as discussed previously. The instruction 85 specifies a new set of class boundaries $N1_{new}$, $N2_{new}$, and $N3_{new}$. The instruction 85 is passed to the decoder circuitry 87 which is arranged to interpret each instruction of the ISA in order to generate control signals to control the operation of the processing circuitry and the prediction circuitry. The decoder circuitry 87 interprets the instruction 85 and generates control signals for the new class definition 89 to be passed to the class definition storage 84 to replace the previously defined class definition 90. The prediction circuitry thereafter generates predictions based on the updated prediction definition 89 stored in the class definition storage 84. While FIG. 10 shows an example where the instruction 85 updates each of the class boundaries in one instruction, in other examples the instruction 85 could modify the class boundary for a given class individually, with multiple instances of the instruction 85 being executed to update class boundaries of more than one class (in that case, the instruction 85 could also specify a class identifier indicating which class is being modified).

Figure 11:
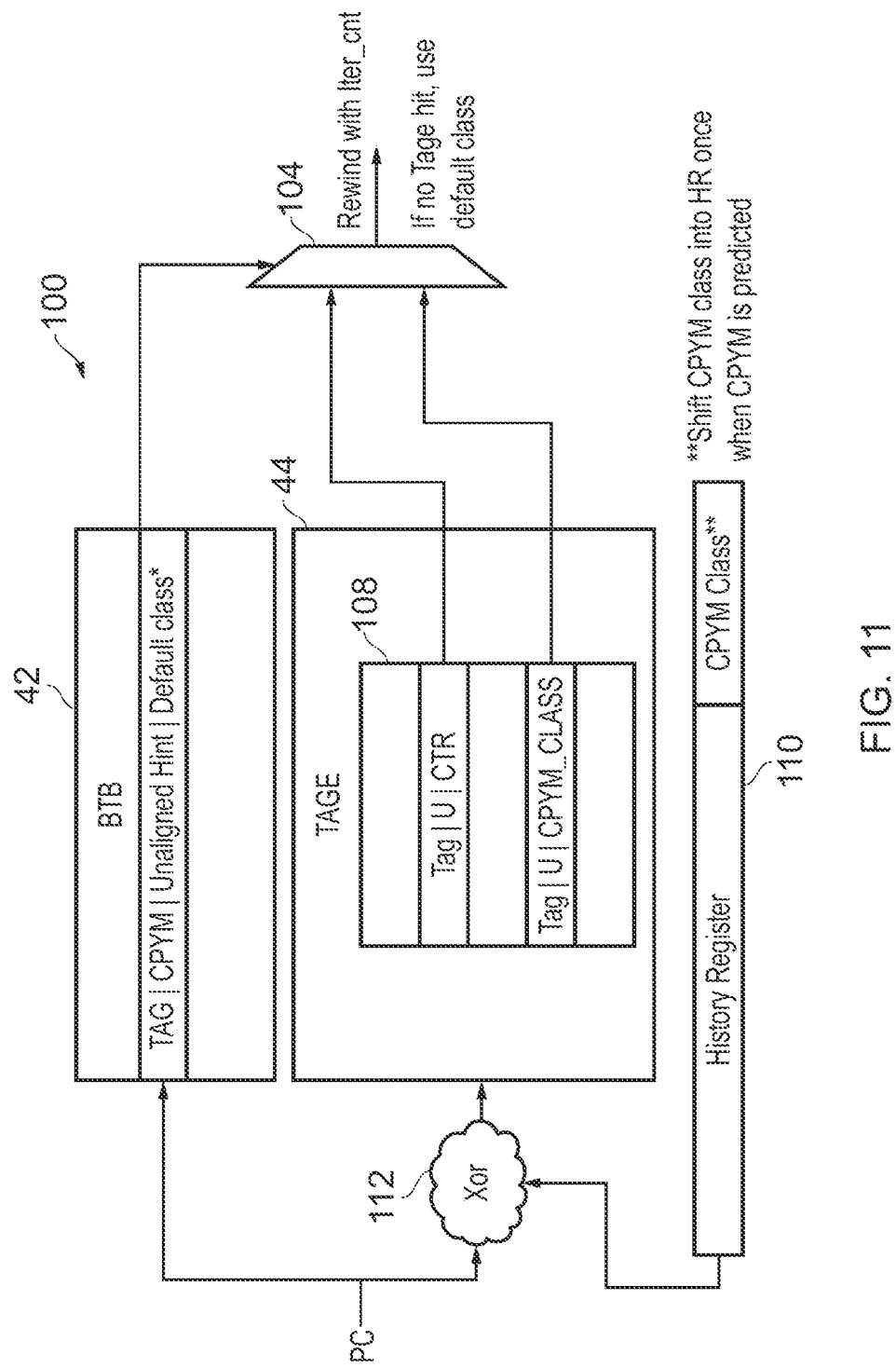
FIG. 11 illustrates details of a branch prediction circuit configured to determine a predicted class.

FIG. 11 schematically illustrates prediction circuitry 100 according to various configurations of the present techniques. The prediction circuitry 100 comprises branch prediction circuitry including a branch target buffer (BTB) 42, a TAGE predictor 44, and history register 110. The branch target buffer 42 contains a plurality of entries comprising a tag, a CPYM indication indicating whether or not that entry corresponds to a regular branch prediction or of a predicated loop branch prediction and, when the CPYM bit indicates that the entry is for a predicated loop branch prediction, an unaligned hint indicative of whether or not the predicated-loop-terminating branch instruction associated with the entry corresponds to an aligned predicated-loop-terminating branch instruction or to an unaligned predicated-loop-terminating branch instruction. In addition, when the CPYM bit indicates that the entry is for a predicated loop branch prediction, the entry contains an indication of a default class to use for the branch prediction. The BTB 42 is looked up based on a hash of the program counter value. If the program counter value hits in the BTB then the BTB returns the CPYM information, the unaligned hint and the default class. The default class returned by the BTB 42 provides a class to be used by the prediction circuitry in the even that there is not a hit in the TAGE predictor 44. The TAGE predictor 44 comprises a plurality of tables 108 each of which contain a plurality of entries. Each of the plurality of entries comprises a tag, a usefulness indicator U and either information indicative of a whether a branch is taken or not taken (CTR), or information indicative of a class (CPYM_CLASS) indicating a range of numbers of iterations predicted using the entry. Each tag stored in the TAGE predictor 44 is generated based on a hash of the program counter value and information contained in the history register 110. In addition to a lookup being performed in the BTB, the program counter and the information contained in the history register 110 is combined using X or logic 112 and the result is used as an input to perform a lookup in the TAGE predictor. The TAGE predictor comprises a plurality of tables, each of which makes use of a different amount of the history data. Tables which use more history data are more likely to produce an accurate prediction for harder to predict branches whose outcome depends on earlier program flow a long distance ago in the past, whilst tables which use less history data are more likely to result in a hit during the TAGE lookup. The lookup in the TAGE predictor 44 results in a hit if any of the tables results in a hit and the prediction that is returned is the one from the table, selected from among those tables encountering a hit, for which the most history data is used. The output of the TAGE predictor 44 and the BTB 42 are fed into the selection logic 104 which determines the class to be used. The class that is used is either, when the TAGE lookup results in a miss, the class provided by the BTB 42 or, when the TAGE lookup results in a hit, the class determined by the TAGE lookup. The history register is updated when a class is predicted by the prediction circuitry to provide an up to date history for the TAGE predictor 44. In the event of a misprediction which requires the flushing of instructions from the processing circuitry (for example, an under-prediction or a prediction for which the resolved number of iterations falls outside of the prediction class) any history data that is associated with flushed instructions is also flushed from the prediction pipeline.

The provision of the CPYM class information into the history register at the time of prediction provides a useful indication of program flow for predicated-loop-terminating branch instructions. In contrast, if the CPYM outcome was represented using taken/not-taken outcomes for each loop iteration in a similar representation to the taken/not-taken outcomes used for regular branches, then for a single predicated-loop-terminating branch instruction which may result in numerous taken branches (one for each iteration) followed (at the end of the sequence of iterations) by a non-taken branch, as the number of iterations may be quite large, it is possible that a single predicated-loop-terminating branch instruction could flood the history register with repeated indications of the branch being taken making it difficult to distinguish the recent execution history. Hence, the inclusion of the class prediction in the history register for predicated-loop-terminating branch instructions, in combination with a taken/not taken indication for regular branch instructions, provides a more meaningful representation of recent program flow and helps to make more efficient use of the limited storage capacity of the history register 110.

Figure 12:
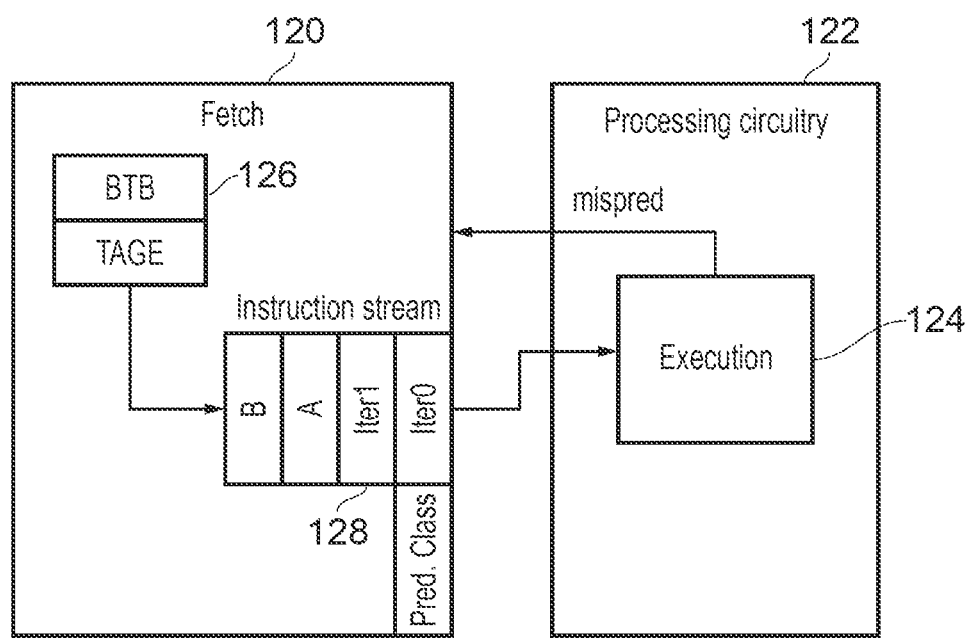
FIG. 12 illustrates details of an instruction stream fetched for a determined prediction class.

FIG. 12 schematically illustrates details of the interaction between the prediction circuitry 126 and the processing circuitry 124. The prediction circuitry 126 comprises a BTB and a TAGE predictor to generate a prediction of a class and a corresponding predetermined number of iterations. In the illustrated configuration, the predicted class indicates that two iterations should be generated and passed, as part of the instruction stream 128, to the execution unit 124 in the processing circuitry 122. The execution unit 124 performs processing of the instruction stream. Once the initial iteration Iter( ) has completed, the processing circuitry 122 is able to determine the number of iterations that should have been predicted and is able to signal an indication to the prediction circuitry 120 indicating whether the prediction was a misprediction or whether the prediction was accurate. This information is used to update the predictions stored in the BTB and the TAGE.

Figure 13:
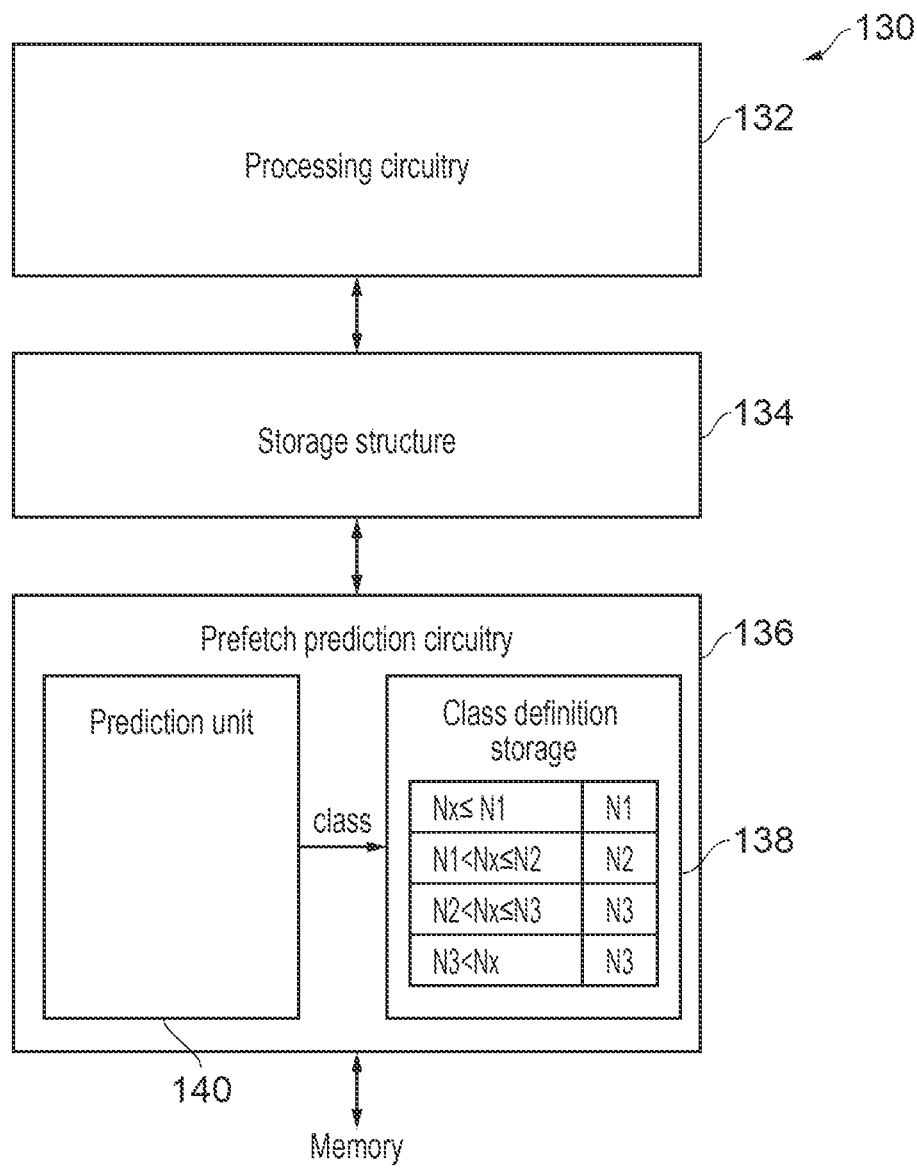
FIG. 13 illustrates details of an apparatus comprising prefetch prediction circuitry.

FIG. 13 schematically illustrates an alternative configuration of the apparatus 130 comprising processing circuitry 132, a storage structure 134 and prefetch prediction circuitry 136. The prefetch prediction circuitry 136 is provided with a prediction unit 140 and a class definition storage 138. The prefetch prediction circuitry 136 is arranged to determine a number of iterations of prefetching to prefetch data from the memory into the storage structure 134. The prediction unit performs 140 performs a prediction to determine a class of a plurality of predicted classes. The number of iterations associated with each of the classes is defined in the class definition storage 138 and is used in combination with the prediction unit 140 as described in relation to FIG. 8 to determine a prediction of a number of iterations of prefetching to perform. Processing circuitry 132 is responsive to the predicted number of iterations of prefetching to trigger at least that number of iterations of the fetching process. The processing circuitry 132 is tolerant of an over-prediction of the number of iterations to provide a result that it is architecturally correct.

Figure 14:
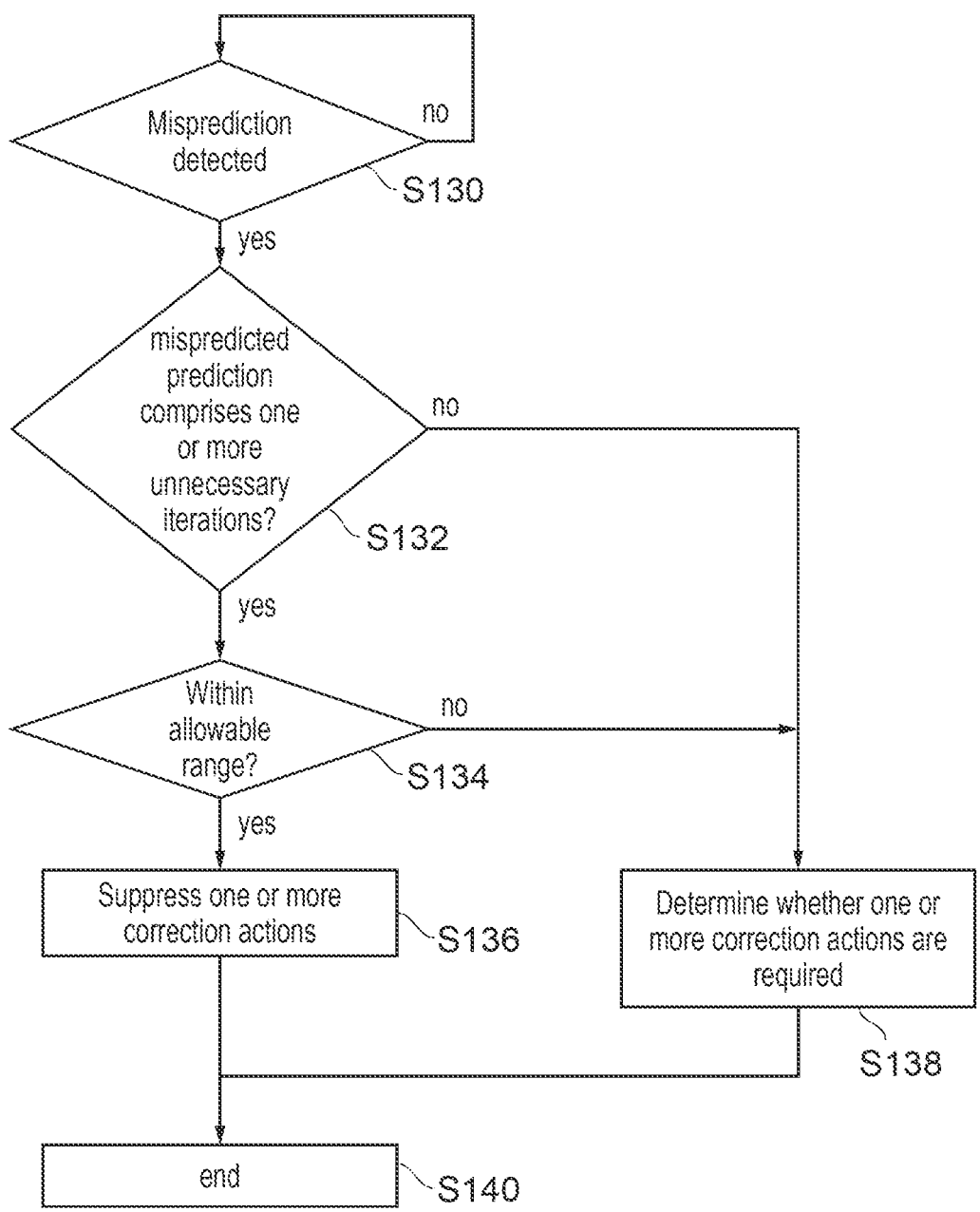
FIG. 14 illustrates a sequence of steps carried out by the processing circuitry in response to a misprediction detection.

FIG. 14 schematically illustrates a sequence of steps carried out by the processing circuitry in response to resolution of a number of iterations. Flow begins at step S130 where it is determined whether a misprediction is detected. If, at step S130, a misprediction is not detected then flow remains at step S130. If, at step S130, it is determined that a misprediction is detected then flow proceeds to step S132 where it is determined if the mispredicted prediction comprises one or more unnecessary iterations, i.e., whether the misprediction is an over prediction or an under prediction. If, at step S132, it is determined that the mispredicted prediction does not contain one or more unnecessary iterations then flow proceeds to step S138 where it is determined whether or not one or more correction actions are required before flow ends at step S140. If, at step S132, it was determined that the misprediction does comprise one or more unnecessary iterations then flow proceeds to step S134. At step S134 it is determined whether the number of unnecessary predictions is within an allowable range. If the number of unnecessary iterations is not in the allowable range then flow proceeds to step S138. If, at step S134, it was determined that the misprediction was within the allowable range, then flow proceeds to step S136, where one or more correction actions are suppressed and the unnecessary iterations are allowed to be processed. Flow then ends at step S140.

Figure 15:
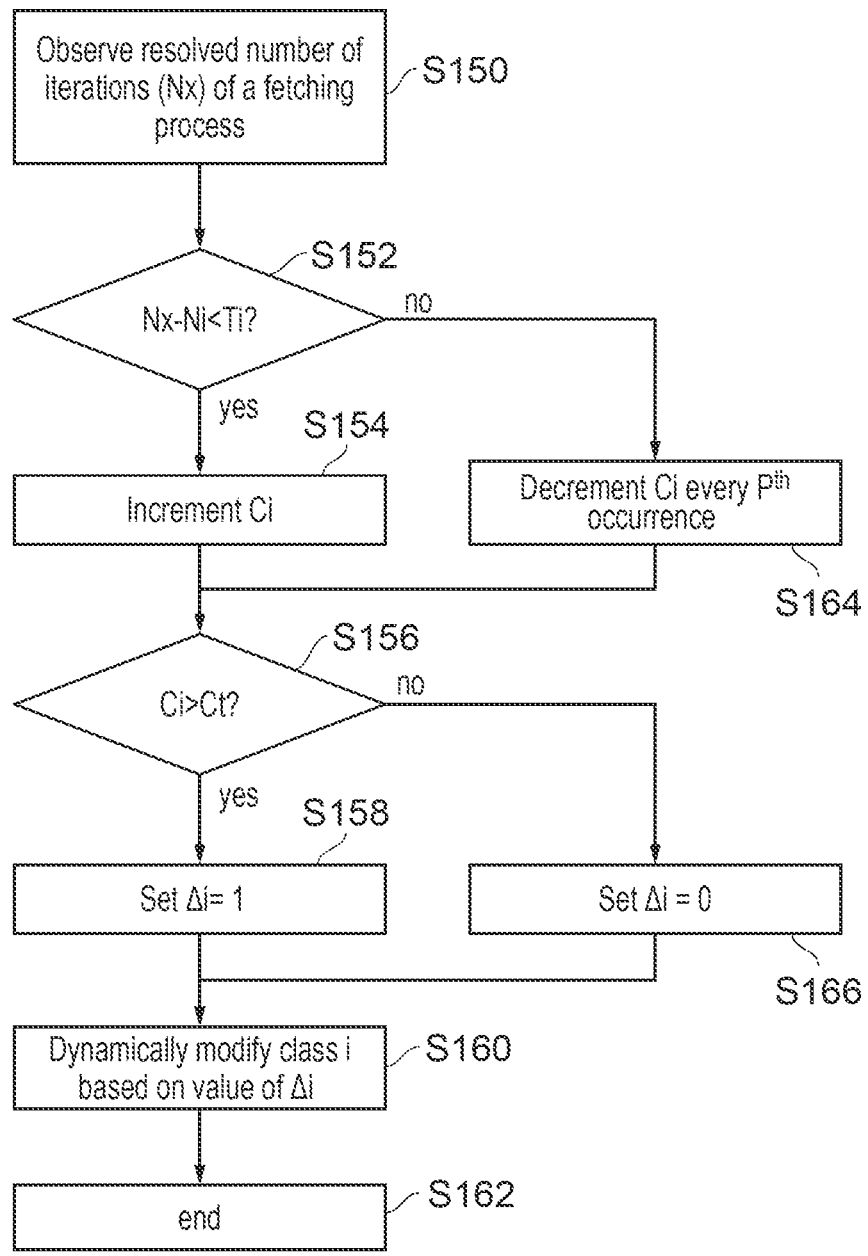
FIG. 15 illustrates a sequence of steps carried out to modify the number of iterations associated with a class.

FIG. 15 schematically illustrates a sequence of steps carried out by the prediction circuitry in response to receipt of an indication of a resolved number of iterations. Flow begins at step S150 where an observed resolved number of iterations (Nx) is received. Flow then proceeds to step S152, where it is determined if the number of iterations is Nx is within a threshold distance Ti of Ni. In other words, it is determined if the number of iterations falls within a threshold distance of class boundary Ni. If, at step S152, it is determined that the received number of iterations Nx is not within a threshold distance Ti of Ni then flow proceeds to step S164 where counter Ci (which, as illustrated in FIG. 8, is indicative of a number of recent occurrences of iterations that fall just outside of class boundary Ni) is decremented on every $P^{th}$ occurrence of this step. Flow then proceeds to step S156. If, at step S152, it was determined that Nx was within a threshold distance Ti of Ni then flow proceeds to step S154, where Ci is incremented before flow proceeds to step S156. At step S156, it is determined whether Ci is greater than a threshold value Ct. If, at step S156, it is determined that Ci is not greater than the threshold value Ct, then flow proceeds to step S166 whereAi is set equal to 0 before flow proceeds to step S160. If, at step S156, it was determined that Ci was greater than the threshold value Ct, then flow proceeds to step S158 whereAi is set equal to 1. Flow then proceeds to step S160 where class i is dynamically modified based on the value of Ai. Flow then ends at step S162. It would be readily apparent to the skilled person that the algorithm for dynamically modifying the class definition is provided by way of example, and that numerous other algorithms could be provided to dynamically modify the class definition. For example, the threshold Ti, referred to in step S152, could take any value, furthermore, the value of Δi could be set to a different value or could be set based on a linear or non-linear function of the counter Ci. Furthermore, the increment/decrements to Ci could be determined based on a calculation of the difference between Nx and Ni.

Figure 16:
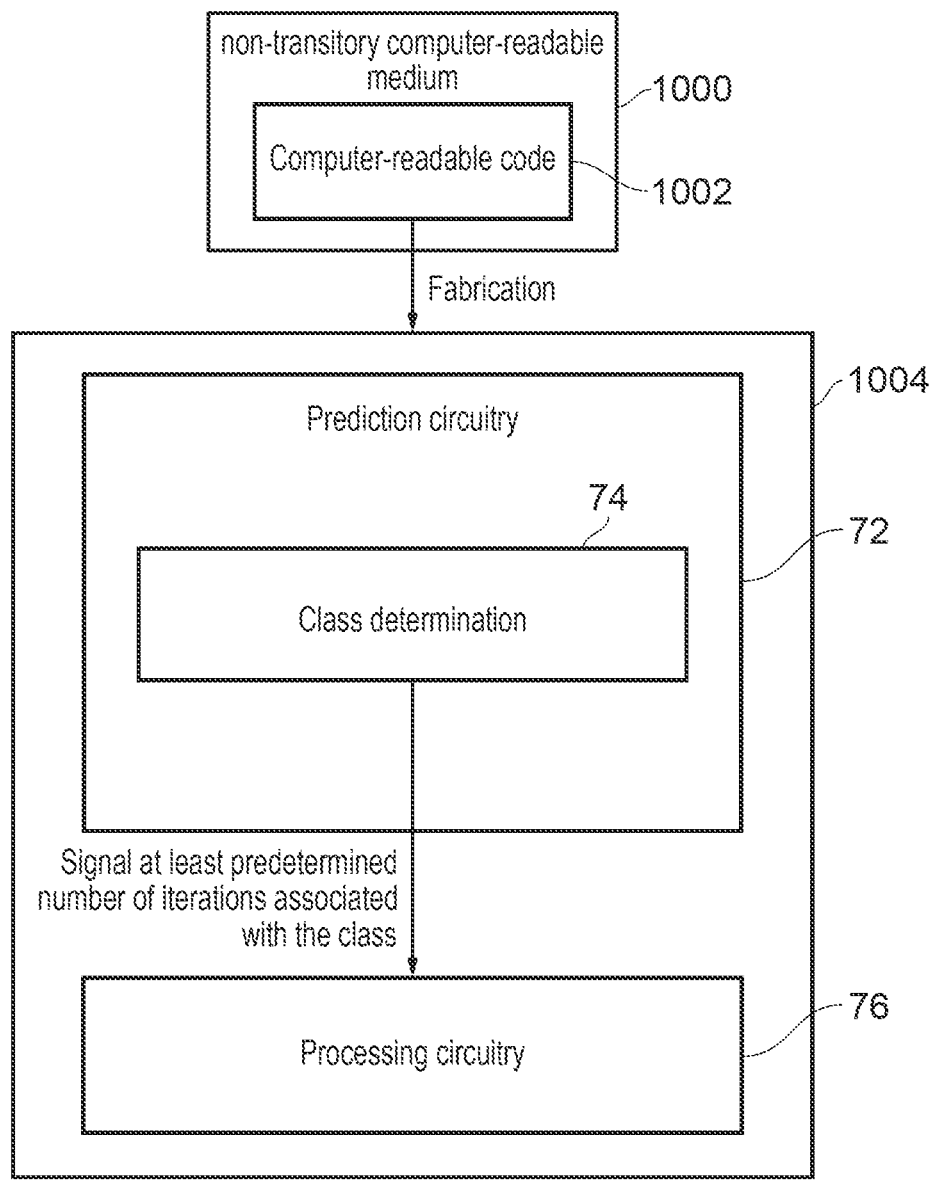
FIG. 16 illustrates fabrication of an apparatus.

FIG. 16 schematically illustrates a non-transitory computer-readable medium comprising computer readable code for fabrication of a data processing apparatus according to various configurations of the present techniques. Fabrication is carried out based on computer readable code 1002 that is stored on a non-transitory computer-readable medium 1000. The computer-readable code can be used at one or more stages of a semiconductor design and fabrication process, including an electronic design automation (EDA) stage, to fabricate an integrated circuit comprising the apparatus embodying the concepts. The fabrication process involves the application of the computer readable code 1002 either directly into one or more programmable hardware units such as a field programmable gate array (FPGA) to configure the FPGA to embody the configurations described hereinabove or to facilitate the fabrication of an apparatus implemented as one or more integrated circuits or otherwise that embody the configurations described hereinabove. By way of example, the fabricated design 1004 comprises prediction circuitry 72 and processing circuitry 76 as described in relation to FIG. 7. However, the fabricated design may correspond to any of the circuits described in FIG. 1, 7-8, or 10-13 as described herein.

In brief overall summary there is provided an apparatus, method and medium. The apparatus comprises processing circuitry to perform data processing in response to decoded instructions and prediction circuitry to generate a prediction of a number of iterations of a fetching process. The fetching process is used to control fetching of data or instructions to be used in processing operations that are predicted to be performed by the processing circuitry. The processing circuitry is configured to tolerate performing one or more unnecessary iterations of the fetching process following an over-prediction of the number of iterations and, for at least one prediction, to determine a class of a plurality of prediction classes, each of which corresponds to a range of numbers of iterations. The prediction circuitry is also arranged to signal a predetermined number of iterations associated with the class to the processing circuitry to trigger at least the predetermined number of iterations of the fetching process.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

Some example configurations are set out in the following numbered clauses:

Clause 1. An apparatus comprising:
processing circuitry to perform data processing in response to decoded instructions; and
prediction circuitry to generate a prediction of a number of iterations of a fetching process, the fetching process used to control fetching of data or instructions to be used in processing operations that are predicted to be performed by the processing circuitry,
wherein:
the processing circuitry is configured to tolerate performing one or more unnecessary iterations of the fetching process following an over-prediction of the number of iterations; and
the prediction circuitry is configured, for at least one prediction, to determine a class of a plurality of prediction classes, each of the plurality of prediction classes corresponding to a range of numbers of iterations, and to signal a predetermined number of iterations associated with the class to the processing circuitry to trigger at least the predetermined number of iterations of the fetching process.

Clause 2. The apparatus of clause 1, wherein the prediction circuitry comprises class definition storage circuitry to store a class definition, the class definition defining the range of numbers of iterations associated with at least one of the plurality of prediction classes.

Clause 3. The apparatus of clause 2, wherein the processing circuitry is responsive to a class modification instruction specifying a modified class definition to update the class definition with the modified class definition.

Clause 4. The apparatus of any of clauses 2 to 3, wherein the prediction circuitry is configured to dynamically adjust the class definition in response to a distribution of resolved iteration counts.

Clause 5. The apparatus of clause 4, wherein the prediction circuitry is responsive to the distribution of resolved iteration counts indicating frequent occurrences of a particular number of iterations that falls outside of one of the plurality of prediction classes and within a dynamic adjustment threshold of the one of the plurality of prediction classes, to dynamically modify the class definition to extend the one of the plurality of prediction classes to include the particular number of iterations.

Clause 6. The apparatus of any preceding clause, wherein:
the plurality of prediction classes comprises a highest prediction class associated with a range of highest numbers of iterations;
the predetermined number of iterations associated with each prediction class other than the highest prediction class is a maximum number of iterations associated with that prediction class; and
the predetermined number of iterations associated with the highest prediction class is a predefined maximum number of iterations.

Clause 7. The apparatus of any preceding clause, wherein the prediction circuitry comprises branch prediction circuitry configured to perform branch prediction to predict outcomes of branch instructions, and based on the branch prediction, to perform, as the number of iterations of the fetching process, fetching iterations of instructions to be decoded for processing by the processing circuitry.

Clause 8. The apparatus of clause 7, wherein the prediction circuitry is configured to generate the prediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, wherein if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an effect of the at least one unnecessary iteration of the predicated loop body.

Clause 9. The apparatus of clause 8, wherein:
the branch prediction circuitry comprises one or more prediction tables each comprising a plurality of branch predictions;
the branch prediction circuitry is configured to perform the branch prediction by performing a lookup in the one or more prediction tables; and
for an entry of the one or more prediction tables predicted to correspond to the predicated-loop-terminating branch instruction, the entry specifies a predicted class identifying the class to use for predicting the predetermined number of iterations.

Clause 10. The apparatus of clause 9, wherein the lookup is based on a program counter value associated with the predicated-loop-terminating branch instruction.

Clause 11. The apparatus of clause 9 or clause 10, further comprising program flow history storage to store history data indicative of a history of program flow,
wherein:
the one or more prediction tables comprises a plurality of history dependent prediction tables;
the lookup comprises a history dependent lookup based on the history data in the plurality of history dependent prediction tables; and
the prediction circuitry is responsive to the history dependent lookup resulting in a hit, to determine the class based on the hit.

Clause 12. The apparatus of clause 11 wherein the prediction circuitry is configured, for the prediction of the number of iterations of the fetching process, to store the class used for predicting the predetermined number of iterations to the program flow history storage.

Clause 13. The apparatus of any clauses 9 to 12, wherein
the prediction circuitry is configured to store, in the one or more prediction tables, prediction type information indicative of whether that prediction corresponds to a class prediction or a regular branch prediction; and
each prediction specified in the one or more prediction tables having a prediction field, which for class predictions is configured to indicate the class and for regular branch predictions is configured to indicate a predicted branch outcome.

Clause 14. The apparatus of any of clauses 9 to 13, wherein the predicated loop body comprises operations to:
determine a variable number of bytes to be processed in a current iteration;
perform at least one processing operation based on the variable number of bytes determined for the current iteration, the at least one processing operation including at least one of a load operation and a store operation; and
update based on the variable number of bytes, a remaining bytes parameter indicative of a remaining number of bytes to be processed.

Clause 15. The apparatus of clause 14, wherein the loop termination condition for a given iteration of the predicated-loop-terminating branch instruction is satisfied when the remaining bytes parameter indicates that the number of remaining bytes to be processed is zero.

Clause 16. The apparatus of clause 14 or clause 15, wherein:
the variable number of bytes is dependent on alignment of a target address of the at least one of the load operation and the store operation with respect to an alignment boundary;
the prediction circuitry is configured to store, in the one or more prediction tables, alignment hint information indicative of whether that prediction corresponds to an aligned target address; and
the prediction circuitry is responsive to the branch prediction comprising alignment information indicating that the prediction corresponds to an unaligned target address, to trigger an additional iteration of the fetching process in addition to triggering at least the predetermined number of iterations of the fetching process.

Clause 17. The apparatus of any of clauses 8 to 16, wherein the predicated loop body comprises a memory copy operation to copy data from a first memory region to a second memory region.

Clause 18. The apparatus of any preceding clause, comprising misprediction circuitry to perform one or more correction actions in response to at least one of:
a misprediction of the number of iterations being an under-prediction of the number of iterations;
a misprediction of the number of iterations being an over-prediction and falling outside an allowable iteration range.

Clause 19. The apparatus of any of clauses 1 to 6, wherein the prediction circuitry is prefetch prediction circuitry configured perform a prefetch prediction to predict, as the number of iterations, a number of blocks of data or instructions to be prefetched from memory into a storage structure associated with the processing circuitry and, based on the prefetch prediction, to perform, as the fetching process, a number of iterations of prefetching.

Clause 20. A method of operating an apparatus comprising processing circuitry to perform data processing in response to decoded instructions, the method comprising:
generating a prediction of a number of iterations of a fetching process, the fetching process used to control fetching of data or instructions to be used in processing operations that are predicted to be performed by the processing circuitry,
wherein the processing circuitry is configured to tolerate performing one or more unnecessary iterations of the fetching process following an over-prediction of the number of iterations; and
for at least one prediction, determining a class of a plurality of prediction classes, each of the plurality of prediction classes corresponding to a range of numbers of iterations, and signalling a predetermined number of iterations associated with the class to the processing circuitry to trigger at least the predetermined number of iterations of the fetching process.

Clause 21. A non-transitory computer readable storage medium to store computer-readable code for fabrication of an apparatus comprising:
processing circuitry to perform data processing in response to decoded instructions; and
prediction circuitry to generate a prediction of a number of iterations of a fetching process, the fetching process used to control fetching of data or instructions to be used in processing operations that are predicted to be performed by the processing circuitry, wherein:

the processing circuitry is configured to tolerate performing one or more unnecessary iterations of the fetching process following an over-prediction of the number of iterations; and the prediction circuitry is configured, for at least one prediction, to determine a class of a plurality of prediction classes, each of the plurality of prediction classes corresponding to a range of numbers of iterations, and to signal a predetermined number of iterations associated with the class to the processing circuitry to trigger at least the predetermined number of iterations of the fetching process.

We claim:

1. An apparatus comprising:

processing circuitry to perform data processing in response to decoded instructions; and prediction circuitry to generate a prediction of a number of iterations of a fetching process, the fetching process used to control fetching of data or instructions to be used in processing operations that are predicted to be performed by the processing circuitry, wherein:

the processing circuitry is configured to tolerate performing one or more unnecessary iterations of the fetching process following an over-prediction of the number of iterations; and the prediction circuitry is configured, for at least one prediction, to determine a class of a plurality of prediction classes, each of the plurality of prediction classes corresponding to a range of numbers of iterations, and to signal a predetermined number of iterations associated with the class to the processing circuitry to trigger at least the predetermined number of iterations of the fetching process.

2. The apparatus of claim 1, wherein the prediction circuitry comprises class definition storage circuitry to store a class definition, the class definition defining the range of numbers of iterations associated with at least one of the plurality of prediction classes.

3. The apparatus of claim 2, wherein the processing circuitry is responsive to a class modification instruction specifying a modified class definition to update the class definition with the modified class definition.

4. The apparatus of claim 2, wherein the prediction circuitry is configured to dynamically adjust the class definition in response to a distribution of resolved iteration counts.

5. The apparatus of claim 4, wherein the prediction circuitry is responsive to the distribution of resolved iteration counts indicating frequent occurrences of a particular number of iterations that falls outside of one of the plurality of prediction classes and within a dynamic adjustment threshold of the one of the plurality of prediction classes, to dynamically modify the class definition to extend the one of the plurality of prediction classes to include the particular number of iterations.

6. The apparatus of claim 1, wherein:

the plurality of prediction classes comprises a highest prediction class associated with a range of highest numbers of iterations;

for each prediction class other than the highest prediction class, the predetermined number of iterations associated with the class is a maximum number of iterations associated with that prediction class; and for the highest prediction class, the predetermined number of iterations associated with the class is a predefined maximum number of iterations.

7. The apparatus of claim 1, wherein the prediction circuitry comprises branch prediction circuitry configured to perform branch prediction to predict outcomes of branch instructions, and based on the branch prediction, to perform, as the number of iterations of the fetching process, fetching iterations of instructions to be decoded for processing by the processing circuitry.

8. The apparatus of claim 7, wherein the prediction circuitry is configured to generate the prediction for a predicated-loop-terminating branch instruction for controlling, based on whether a loop termination condition is satisfied, whether the processing circuitry should process a further iteration of a predicated loop body or process a following instruction to be processed after a final iteration of the predicated loop body, wherein if at least one unnecessary iteration of the predicated loop body is processed following a mispredicted-non-termination branch misprediction when the loop termination condition is mispredicted as unsatisfied for a given iteration of the predicated-loop-terminating branch instruction when the loop termination condition should have been satisfied, processing of the at least one unnecessary iteration of the predicated loop body is predicated to suppress an effect of the at least one unnecessary iteration of the predicated loop body.

9. The apparatus of claim 8, wherein:

the branch prediction circuitry comprises one or more prediction tables each comprising a plurality of branch predictions;

the branch prediction circuitry is configured to perform the branch prediction by performing a lookup in the one or more prediction tables; and for an entry of the one or more prediction tables predicted to correspond to the predicated-loop-terminating branch instruction, the entry specifies a predicted class identifying the class to use for predicting the predetermined number of iterations.

10. The apparatus of claim 9, wherein the lookup is based on a program counter value associated with the predicated-loop-terminating branch instruction.

11. The apparatus of claim 9, further comprising program flow history storage to store history data indicative of a history of program flow, wherein:

the one or more prediction tables comprises a plurality of history dependent prediction tables;

the lookup comprises a history dependent lookup based on the history data in the plurality of history dependent prediction tables; and the prediction circuitry is responsive to the history dependent lookup resulting in a hit, to determine the class based on the hit.

12. The apparatus of claim 11 wherein the prediction circuitry is configured, for the prediction of the number of iterations of the fetching process, to store the class used for predicting the predetermined number of iterations to the program flow history storage.

13. The apparatus of claim 9, wherein the prediction circuitry is configured to store, in the one or more prediction tables, prediction type information indicative of whether that prediction corresponds to a class prediction or a regular branch prediction; and each prediction specified in the one or more prediction tables having a prediction field, which for class predictions is configured to indicate the class and for regular branch predictions is configured to indicate a predicted branch outcome.

14. The apparatus of claim 9, wherein the predicated loop body comprises operations to:
   determine a variable number of bytes to be processed in a current iteration;
   perform at least one processing operation based on the variable number of bytes determined for the current iteration, the at least one processing operation including at least one of a load operation and a store operation; and
   update based on the variable number of bytes, a remaining bytes parameter indicative of a remaining number of bytes to be processed.

15. The apparatus of claim 14, wherein the loop termination condition for a given iteration of the predicated-loop-terminating branch instruction is satisfied when the remaining bytes parameter indicates that the number of remaining bytes to be processed is zero.

16. The apparatus of claim 14, wherein:
   the variable number of bytes is dependent on alignment of a target address of the at least one of the load operation and the store operation with respect to an alignment boundary;
   the prediction circuitry is configured to store, in the one or more prediction tables, alignment hint information indicative of whether that prediction corresponds to an aligned target address; and
   the prediction circuitry is responsive to the branch prediction comprising alignment information indicating that the prediction corresponds to an unaligned target address, to trigger an additional iteration of the fetching process in addition to triggering at least the predetermined number of iterations of the fetching process.

17. The apparatus of claim 8, wherein the predicated loop body comprises a memory copy operation to copy data from a first memory region to a second memory region.

18. The apparatus of claim 1, wherein the prediction circuitry is prefetch prediction circuitry configured perform a prefetch prediction to predict, as the number of iterations, a number of blocks of data or instructions to be prefetched from memory into a storage structure associated with the processing circuitry and, based on the prefetch prediction, to perform, as the fetching process, a number of iterations of prefetching.

19. A method of operating an apparatus comprising processing circuitry to perform data processing in response to decoded instructions, the method comprising:
   generating a prediction of a number of iterations of a fetching process, the fetching process used to control fetching of data or instructions to be used in processing operations that are predicted to be performed by the processing circuitry,
   wherein the processing circuitry is configured to tolerate performing one or more unnecessary iterations of the fetching process following an over-prediction of the number of iterations; and
   for at least one prediction, determining a class of a plurality of prediction classes, each of the plurality of prediction classes corresponding to a range of numbers of iterations, and signalling a predetermined number of iterations associated with the class to the processing circuitry to trigger at least the predetermined number of iterations of the fetching process.

20. A non-transitory computer readable storage medium to store computer-readable code for fabrication of an apparatus comprising:
   processing circuitry to perform data processing in response to decoded instructions; and
   prediction circuitry to generate a prediction of a number of iterations of a fetching process, the fetching process used to control fetching of data or instructions to be used in processing operations that are predicted to be performed by the processing circuitry,
   wherein:
   the processing circuitry is configured to tolerate performing one or more unnecessary iterations of the fetching process following an over-prediction of the number of iterations; and
   the prediction circuitry is configured, for at least one prediction, to determine a class of a plurality of prediction classes, each of the plurality of prediction classes corresponding to a range of numbers of iterations, and to signal a predetermined number of iterations associated with the class to the processing circuitry to trigger at least the predetermined number of iterations of the fetching process.

* * * * *